(12) United States Patent
Makino et al.

(10) Patent No.: US 12,197,054 B2
(45) Date of Patent: Jan. 14, 2025

(54) OPTICAL DEVICE AND OPTICAL COMMUNICATION APPARATUS

(71) Applicant: Fujitsu Optical Components Limited, Kawasaki (JP)

(72) Inventors: Shuntaro Makino, Kawasaki (JP); Masaharu Doi, Sapporo (JP); Yoshihiko Yoshida, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 261 days.

(21) Appl. No.: 17/726,249

(22) Filed: Apr. 21, 2022

(65) Prior Publication Data

US 2022/0390775 A1 Dec. 8, 2022

(30) Foreign Application Priority Data

Jun. 3, 2021 (JP) .................................. 2021-093469

(51) Int. Cl.
*G02F 1/03* (2006.01)
*G02F 1/035* (2006.01)

(52) U.S. Cl.
CPC ............ *G02F 1/035* (2013.01); *G02F 1/0316* (2013.01); *G02F 1/0327* (2013.01); *G02F 2201/122* (2013.01)

(58) Field of Classification Search
CPC ...... G02F 1/035; G02F 1/0316; G02F 1/0327; G02F 2201/122
See application file for complete search history.

(56) References Cited

U.S. PATENT DOCUMENTS

| 4,448,479 A | * | 5/1984 | Alferness | G02F 1/0356 385/28 |
| 5,787,211 A | * | 7/1998 | Gopalakrishnan | G02F 1/2255 385/2 |

(Continued)

FOREIGN PATENT DOCUMENTS

| JP | 2005-221874 A | 8/2005 |
| WO | WO 2007/058366 A1 | 5/2007 |

OTHER PUBLICATIONS

Abouelez, Ahmed. (2020). Photonic generation of millimeter-wave signal through frequency 12-tupling using two cascaded dual-parallel polarization modulators. Optical and Quantum Electronics. 52. 2020. (Year: 2020).*

(Continued)

*Primary Examiner* — Peter Radkowski
(74) *Attorney, Agent, or Firm* — STAAS & HALSEY LLP

(57) ABSTRACT

An optical device includes an X-cut substrate, and a first waveguide and a second waveguide each being formed on the substrate and having a folding structure. The optical device includes a first signal electrode to generate a first electric field, and a second signal electrode to generate a second electric field with a reverse phase as compared to the first field. The first waveguide includes a first waveguide on an outward side to which the first field is applied from the first signal electrode, and a first waveguide on a return side to which the second field is applied from the second signal electrode. The second waveguide includes a second waveguide on the outward side to which the first field is applied from the first signal electrode, and a second waveguide on the return side to which the second field is applied from the second signal electrode.

8 Claims, 12 Drawing Sheets

(56) References Cited

U.S. PATENT DOCUMENTS

| | | | | |
|---|---|---|---|---|
| 6,483,953 | B1* | 11/2002 | McBrien | G02F 1/0356 385/2 |
| 6,580,840 | B1* | 6/2003 | McBrien | G02F 1/2255 385/2 |
| 6,836,573 | B2* | 12/2004 | Soda | G02F 1/3133 385/2 |
| 7,212,326 | B2 | 5/2007 | Wooten et al. | |
| 7,286,727 | B2* | 10/2007 | Sugiyama | G02F 1/035 385/14 |
| 7,382,942 | B2* | 6/2008 | Mitomi | G02B 6/125 385/9 |
| 7,426,321 | B2* | 9/2008 | Eriksson | G02F 1/035 385/2 |
| 7,471,853 | B2* | 12/2008 | Sugiyama | G02F 1/225 385/2 |
| 7,603,002 | B2* | 10/2009 | Sugiyama | G02F 1/2255 385/40 |
| 7,627,213 | B2* | 12/2009 | Sugiyama | G02F 1/0356 385/11 |
| 7,630,587 | B2* | 12/2009 | Sugiyama | G02F 1/225 385/2 |
| 7,668,409 | B2* | 2/2010 | Sugiyama | G02F 1/0356 385/14 |
| 7,801,400 | B2* | 9/2010 | Sugiyama | G02F 1/035 385/32 |
| 7,995,872 | B2* | 8/2011 | Aoki | G02F 1/225 385/2 |
| 8,218,914 | B2* | 7/2012 | Kissa | G02F 1/0121 385/40 |
| 8,233,752 | B2* | 7/2012 | Ide | G02B 6/125 385/32 |
| 8,346,025 | B2* | 1/2013 | Gill | G02F 1/2257 438/31 |
| 8,406,576 | B2* | 3/2013 | Sugiyama | G02F 1/0356 385/2 |
| 8,411,349 | B2* | 4/2013 | Mitomi | G02F 1/2255 359/254 |
| 8,530,821 | B2* | 9/2013 | Green | G02F 1/025 250/227.12 |
| 8,737,773 | B2* | 5/2014 | Motoya | G02F 1/2255 385/2 |
| 8,774,569 | B2* | 7/2014 | Dougherty | B82Y 20/00 385/14 |
| 8,849,071 | B2* | 9/2014 | Kissa | G02F 1/225 385/50 |
| 9,372,381 | B2* | 6/2016 | Vermeulen | G02F 1/2257 |
| 9,519,200 | B2* | 12/2016 | Kataoka | G02F 1/2255 |
| 9,671,670 | B2* | 6/2017 | Hollis | G02B 6/14 |
| 9,746,743 | B1* | 8/2017 | Rabiei | G02B 6/12009 |
| 9,810,964 | B2* | 11/2017 | Porte | G02F 1/365 |
| 9,817,249 | B2* | 11/2017 | Doerr | G02F 1/011 |
| 10,295,847 | B1* | 5/2019 | Tytgat | G02F 1/2257 |
| 10,466,567 | B1* | 11/2019 | Vera Villarroel | G02F 1/2255 |
| 10,530,487 | B2* | 1/2020 | Ding | H04B 10/5561 |
| 10,955,723 | B2* | 3/2021 | Sugiyama | G02F 1/218 |
| 11,048,139 | B2* | 6/2021 | Zhou | G02F 1/2255 |
| 11,327,384 | B2* | 5/2022 | Mistry | G02B 27/283 |
| 11,378,825 | B2* | 7/2022 | Kissa | G02F 1/025 |
| 11,378,826 | B2* | 7/2022 | Kissa | G02F 1/011 |
| 2004/0047529 | A1* | 3/2004 | Soda | G02F 1/3133 385/2 |
| 2005/0175271 | A1 | 8/2005 | Sugiyama et al. | |
| 2006/0159384 | A1* | 7/2006 | Sugiyama | G02F 1/0356 385/14 |
| 2006/0210212 | A1* | 9/2006 | Sugiyama | G02F 1/035 385/40 |
| 2007/0009195 | A1* | 1/2007 | Eriksson | G02F 1/035 385/40 |
| 2007/0104407 | A1* | 5/2007 | Mitomi | G02B 6/125 385/9 |
| 2008/0056637 | A1* | 3/2008 | Sugiyama | G02F 1/225 385/3 |
| 2008/0095485 | A1* | 4/2008 | Sugiyama | G02F 1/0356 385/3 |
| 2008/0226215 | A1 | 9/2008 | Aoki et al. | |
| 2008/0260321 | A1* | 10/2008 | Sugiyama | G02F 1/035 385/3 |
| 2008/0317399 | A1* | 12/2008 | Sugiyama | G02F 1/0356 385/3 |
| 2009/0231686 | A1* | 9/2009 | Atkins | G02F 1/39 385/28 |
| 2009/0274408 | A1* | 11/2009 | Aoki | G02F 1/225 385/2 |
| 2009/0290206 | A1* | 11/2009 | Sugiyama | G02F 1/2255 359/254 |
| 2009/0324163 | A1* | 12/2009 | Dougherty | G02B 6/1228 385/14 |
| 2009/0324165 | A1* | 12/2009 | Sugiyama | G02F 1/035 264/1.24 |
| 2010/0111464 | A1* | 5/2010 | Kissa | G02F 1/2255 385/2 |
| 2010/0290732 | A1* | 11/2010 | Gill | B29D 11/00663 385/3 |
| 2010/0329601 | A1* | 12/2010 | Ide | G02B 6/125 385/3 |
| 2011/0081107 | A1* | 4/2011 | Sugiyama | G02F 1/2255 385/2 |
| 2011/0157673 | A1* | 6/2011 | Mitomi | G02F 1/2255 359/279 |
| 2011/0158576 | A1* | 6/2011 | Kissa | G02F 1/225 385/2 |
| 2011/0298561 | A1* | 12/2011 | Green | G02F 1/0121 333/236 |
| 2012/0230627 | A1* | 9/2012 | Motoya | G02F 1/0356 385/3 |
| 2012/0230630 | A1* | 9/2012 | Dougherty | B82Y 20/00 385/14 |
| 2013/0343693 | A1* | 12/2013 | Doerr | G02F 1/011 385/3 |
| 2014/0112611 | A1* | 4/2014 | Vermeulen | G02F 1/225 385/3 |
| 2015/0070709 | A1* | 3/2015 | Porte | G01B 9/02049 356/482 |
| 2016/0054637 | A1* | 2/2016 | Kataoka | G02F 1/2255 385/2 |
| 2016/0202592 | A1* | 7/2016 | Hollis | G02F 1/2255 385/2 |
| 2017/0163000 | A1* | 6/2017 | Evans | H01S 5/1028 |
| 2017/0163001 | A1* | 6/2017 | Evans | H04B 10/572 |
| 2017/0201070 | A1* | 7/2017 | Evans | H01S 5/4025 |
| 2019/0155064 | A1* | 5/2019 | Tytgat | G02F 1/2257 |
| 2019/0253149 | A1* | 8/2019 | Ding | G02F 1/0123 |
| 2019/0271896 | A1* | 9/2019 | Sugiyama | G02F 1/218 |
| 2019/0324345 | A1* | 10/2019 | Vera Villarroel | G02F 1/2255 |
| 2019/0361315 | A1* | 11/2019 | Zhou | G02F 1/025 |
| 2021/0080796 | A1* | 3/2021 | Kissa | G02F 1/0356 |
| 2021/0080797 | A1* | 3/2021 | Kissa | G02F 1/011 |
| 2021/0157177 | A1* | 5/2021 | Kharel | G02F 1/0316 |
| 2022/0043321 | A1* | 2/2022 | Mistry | G02B 27/283 |

OTHER PUBLICATIONS

Akiyama et al., High-speed and efficient silicon modulator based on forward-biased pin diodes, High-Front. Phys., Nov. 20, 2014, Sec. Interdisciplinary Physics vol. 2—2014 https://doi.org/10.3389/fphy.2014.00065 (Year: 2014).*

Allcock et al., Heating rate and electrode charging measurements in a scalable, microfabricated, surface-electrode ion trap, Appl. Phys. B 107, 913 (2012) (Year: 2012).*

Ban et al., "High electro-optic coefficient lead zirconate titanate films toward low-power and compact modulators," Opt. Mater. Express 11, 1733-1741 (2021) (Year: 2021).*

Bitar et al., Multi-pole multi-zero frequency-independent phase-shifter, Rev Sci Instrum 83, 114703 (2012) https://doi.org/10.1063/1.4767240 (Year: 2012).*

Blaicher et al. Hybrid multi-chip assembly of optical communication engines by in situ 3D nano-lithography. Light Sci Appl 9, 71 (2020). https://doi.org/10.1038/s41377-020-0272-5 (Year: 2020).*

(56) References Cited

OTHER PUBLICATIONS

Guo et al., Epitaxial integration of BaTiO3 on Si for electro-optic applications, Journal of Vacuum Science & Technology A 39, 030804 (2021) (Year: 2021).*

Hasan et al., Ultra-High Resolution Wideband on-Chip Spectrometer, in IEEE Photonics Journal, vol. 12, No. 5, pp. 1-17, Oct. 2020, Art No. 6802617, (Year: 2020).*

He et al., High-performance hybrid silicon and lithium niobate Mach-Zehnder modulators for 100 Gbits—1 and beyond. Nat. Photonics 13, 359-364 (2019) (Year: 2019).*

Kodigala et al. Lasing action from photonic bound states in continuum. Nature 541, 196-199 (2017). https://doi.org/10.1038/nature20799 (Year: 2017).*

Kumar et al., High speed optical 4-bit twisted ring counter using electro-optic effect of Mach-Zehnder interferometer, Opt Quant Electron (2016) 48:42 (Year: 2016).*

Lewen et al., Ultra high-speed segmented traveling-wave electroabsorption modulators, OSA/OFC 2003, PD38-1 (Year: 2003).*

Lin et al., High-performance polarization management devices based on thin-film lithium niobate. Light: Science & Applications. 2022. (Year: 2022).*

Patel et al., "Design, analysis, and transmission system performance of a 41 GHz silicon photonic modulator," Opt. Express 23, 14263-14287 (2015) (Year: 2015).*

Peairs, Gregory Alexander, Fast and e_cient transducers for microwave-optical quantum communication, Dissertation, University of California, Santa Barbara, 2019, https://escholarship.org/uc/item/0dd4s9s4 (Year: 2019).*

Shao et al., "Microwave-to-optical conversion using lithium niobate thin-film acoustic resonators," Optica 6, 1498-1505 (2019) (Year: 2019).*

Stepanenko et al. Optimization of RF electrodes for electro-optic modulator based on quantum-confined Stark effect, 2019 J. Phys.: Conf. Ser. 1145 012028 (Year: 2019).*

Tadesse et al., Sub-optical wavelength acoustic wave modulation of integrated photonic resonators at microwave frequencies. Nat Commun. Nov. 17, 2014; 5: 5402 (Year: 2014).*

Wang, Cheng, Lithium Niobate Nonlinear Nanophotonics, Dissertation, SEAS, Harvard University, 2017 (Year: 2017).*

Wang et al., "Nanophotonic lithium niobate electro-optic modulators," Opt. Express 26, 1547-1555 (2018) (Year: 2018).*

Wang et al., "Ultrahigh-efficiency wavelength conversion in nanophotonic periodically poled lithium niobate waveguides," Optica 5, 1438-1441 (2018) (Year: 2018).*

Xu et al. High-performance coherent optical modulators based on thin-film lithium niobate platform. Nat Commun 11, 3911 (2020). (Year: 2020).*

Xu et al., Silicon Integrated Nanophotonic Devices for On-Chip Multi-Mode Interconnects. Appl. Sci. 2020, 10, 6365. (Year: 2020).*

Yudistira et al., Surface acoustic wave generation in -cut superlattices using coplanar electrodes, Appl. Phys. Lett. 95, 052901 (2009) (Year: 2009).*

Zhang et al., Integrated lithium niobate electro-optic modulators: when performance meets scalability, 652 vol. 8, No. 5 / May 2021 / Optica Review (Year: 2021).*

Zhao et al., High-performance silicon polarization switch based on a Mach-Zehnder interferometer integrated with polarization-dependent mode converters, Nanophotonics, vol. 11, No. 10, 2022, pp. 2293-2301. (Year: 2022).*

\* cited by examiner

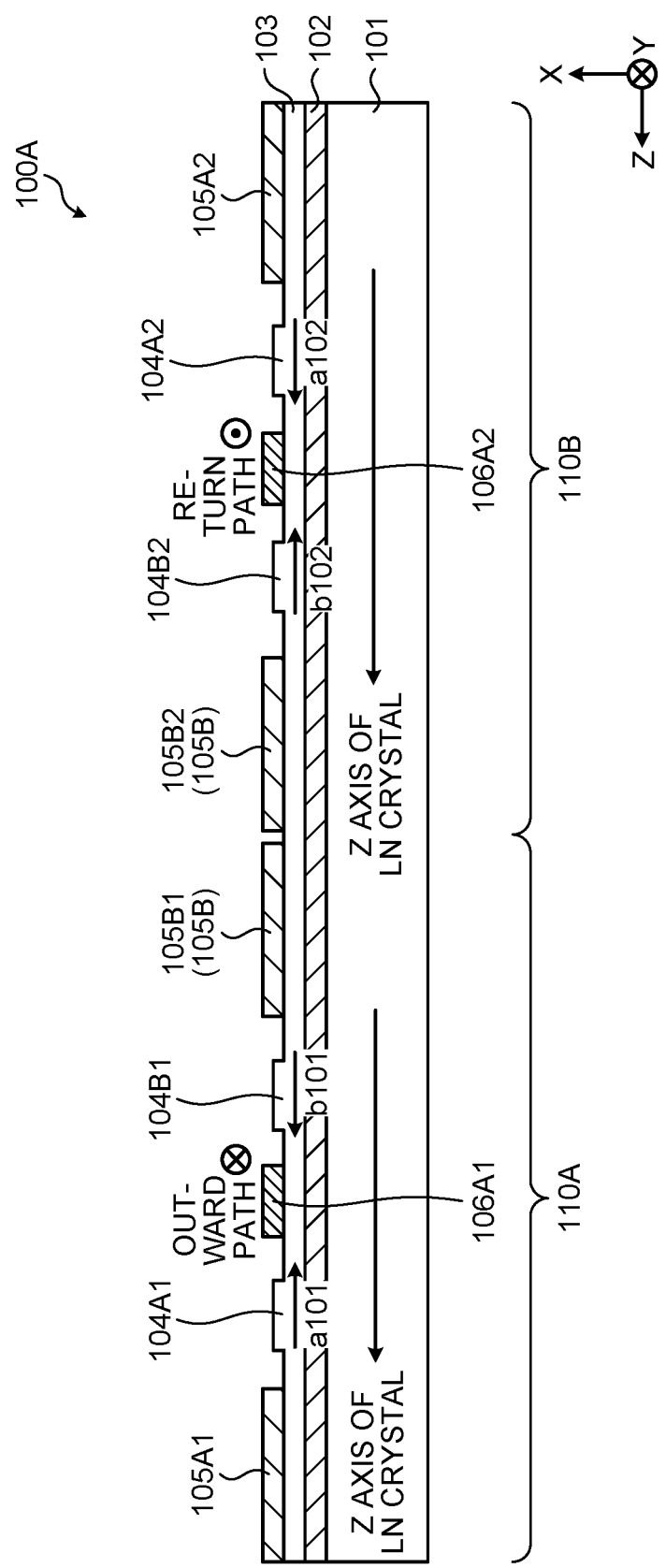

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-093469, filed on Jun. 3, 2021, the entire contents of which are incorporated herein by reference.

FIELD

The embodiments discussed herein are related to an optical device and an optical communication apparatus.

BACKGROUND

For example, an optical device, such as an optical modulator, is configured such that a signal electrode is arranged on an optical waveguide on a surface thereof, and if voltage is applied to the signal electrode, an electric field in a direction perpendicular to the surface of the optical modulator is generated inside the optical waveguide. A refractive index of the optical waveguide is changed by the electric field and a phase of light that propagates through the optical waveguide is changed, so that it becomes possible to modulate the light. In other words, the optical waveguide of the optical modulator constitutes, for example, a Mach-Zehnder interferometer and is able to output, for example, an IQ signal that is x- and y-polarized due to a phase difference of light between a plurality of optical waveguides that are arranged in parallel.

FIG. 10 is a schematic plan view illustrating an example of a configuration of an optical modulator 100, and FIG. 11 is an exemplary schematic cross-sectional view of a portion taken along a line C-C in FIG. 10. The optical modulator 100 illustrated in FIG. 10 and FIG. 11 includes a substrate 101, an intermediate layer 102 that is laminated on the substrate 101, and a thin-film LN substrate 103 that is laminated on the intermediate layer 102 and that is made of a LN (LiNbO$_3$) material. Further, the optical modulator 100 includes two optical waveguides, that is, an eleventh optical waveguide 104A and a twelfth optical waveguide 104B that are formed of the thin-film LN substrate 103, and includes an eleventh ground electrode 105A and a twelfth ground electrode 105B that are formed, as a pair, on the thin-film LN substrate 103. Further, the optical modulator 100 includes an eleventh signal electrode 106 that is arranged so as to be sandwiched between the eleventh ground electrode 105A and the twelfth ground electrode 105B as a pair on the thin-film LN substrate 103.

The substrate 101 is, for example, a substrate made of a certain material, such as Si or LN. The intermediate layer 102 is, for example, a layer made of SiO$_2$ that has a low refractive index as compared to LN. The thin-film LN substrate 103 is a thin-film substrate that is able to confine light at high intensity and that is advantageous in reducing a device size.

The eleventh optical waveguide 104A and the twelfth optical waveguide 104B are formed of the thin-film LN substrate 103, and therefore, are advantageous in terms of insertion loss and transmission characteristics, for example. The thin-film LN substrate 103 is an X-cut substrate, is able to perform chirp-free operation due to structural symmetry, and is suitable for long-distance transmission.

The eleventh optical waveguide 104A is arranged between the eleventh ground electrode 105A and the eleventh signal electrode 106. Further, the twelfth optical waveguide 104B is arranged between the twelfth ground electrode 105B and the eleventh signal electrode 106.

A crystal direction of the thin-film LN substrate 103 is a width direction (Z direction) that is perpendicular to a traveling direction (Y direction). An optical refractive index of the eleventh optical waveguide 104A is changed in accordance with an electric field in an electric field direction a101 from the eleventh ground electrode 105A to the eleventh signal electrode 106. Further, an optical refractive index of the twelfth optical waveguide 104B is changed in accordance with an electric field in an electric field direction b101 from the twelfth ground electrode 105B to the eleventh signal electrode 106.

Modulation efficiency of the optical modulator 100 is largely affected by a length of an interaction portion, such as the eleventh optical waveguide 104A and the twelfth optical waveguide 104B, to which the electric field is applied, and there is a demand for a structure in which the interaction portion is folded to reduce a device size while maintaining the modulation efficiency.

FIG. 12 is a schematic plan view illustrating an example of a configuration of an optical modulator 100A having a folding structure, and FIG. 13 is an exemplary schematic cross-sectional view of a portion taken along a line D-D in FIG. 12. Meanwhile, the same components as those of the optical modulator 100 illustrated in FIG. 10 and FIG. 11 are denoted by the same reference symbols, and explanation on the same configuration and operation will be omitted. The optical modulator 100A illustrated in FIG. 12 has a folding structure in which the eleventh optical waveguide 104A, the twelfth optical waveguide 104B, the eleventh ground electrode 105A, the twelfth ground electrode 105B, and the eleventh signal electrode 106 are folded. The optical modulator 100A includes an interaction portion 110A on an outward side and an interaction portion 110B on a return side.

The eleventh optical waveguide 104A includes an eleventh optical waveguide 104A1 on the outward side and an eleventh optical waveguide 104A2 on the return side. The twelfth optical waveguide 104B includes a twelfth optical waveguide 104B1 on the outward side and a twelfth optical waveguide 104B2 on the return side. The eleventh ground electrode 105A includes an eleventh ground electrode 105A1 on the outward side and an eleventh ground electrode 105A2 on the return side. The twelfth ground electrode 105B includes a twelfth ground electrode 105B1 on the outward side and a twelfth ground electrode 105B2 on the return side. The eleventh signal electrode includes an eleventh signal electrode 106A1 on the outward side and an eleventh signal electrode 106A2 on the return side.

The interaction portion 110A on the outward side includes the eleventh ground electrode 105A1 on the outward side, the eleventh signal electrode 106A1 on the outward side, the eleventh optical waveguide 104A1 on the outward side, the twelfth optical waveguide 104B1 on the outward side, and the twelfth ground electrode 105B1 on the outward side. The eleventh optical waveguide 104A1 on the outward side is arranged between the eleventh ground electrode 105A1 on the outward side and the eleventh signal electrode 106A1 on the outward side. The twelfth optical waveguide 104B1 on the outward side is arranged between the twelfth ground electrode 105B1 on the outward side and the eleventh signal electrode 106A1 on the outward side.

The crystal direction of the thin-film LN substrate 103 is the width direction (Z direction) that is perpendicular to the traveling direction (Y direction). An optical refractive index of the eleventh optical waveguide 104A1 on the outward side is changed in accordance with an electric field in the electric field direction a101 from the eleventh ground electrode 105A1 on the outward side to the eleventh signal electrode 106A1 on the outward side. Further, an optical refractive index of the twelfth optical waveguide 104B1 on the outward side is changed in accordance with an electric field in the electric field direction b101 from the twelfth ground electrode 105B1 on the outward side to the eleventh signal electrode 106A1 on the outward side.

The interaction portion 110B on the return side includes the eleventh ground electrode 105A2 on the return side, the eleventh signal electrode 106A2 on the return side, the twelfth ground electrode 105B2 on the return side, the eleventh optical waveguide 104A2 on the return side, and the twelfth optical waveguide 104B2 on the return side. The eleventh optical waveguide 104A2 on the return side is arranged between the eleventh ground electrode 105A2 on the return side and the eleventh signal electrode 106A2 on the return side. The twelfth optical waveguide 104B2 on the return side is arranged between the twelfth ground electrode 105B2 on the return side and the eleventh signal electrode 106A2 on the return side.

An optical refractive index of the eleventh optical waveguide 104A2 on the return side is changed in accordance with an electric field in an electric field direction a102 from the eleventh ground electrode 105A2 on the return side to the eleventh signal electrode 106A2 on the return side. Further, an optical refractive index of the twelfth optical waveguide 104B2 on the return side is changed in accordance with an electric field in an electric field direction b102 from the twelfth ground electrode 105B2 on the return side to the eleventh signal electrode 106A2 on the return side.

Patent Literature 1: International Publication Pamphlet No. 2007/058366

Patent Literature 2: U.S. Pat. No. 7,212,326 specification

Patent Literature 3: Japanese Laid-open Patent Publication No. 2005-221874

However, in the optical modulator 100A having the folding structure, the electric field direction a102 of the eleventh optical waveguide 104A2 on the return side is the same as the crystal direction (Z direction) of the LN crystal, but the electric field direction a101 of the eleventh optical waveguide 104A1 on the outward side is different from the crystal direction (Z direction) of the LN crystal. Further, the electric field direction a101 of the eleventh optical waveguide 104A1 on the outward side is opposite to the electric field direction a102 of the eleventh optical waveguide 104A2 on the return side. Therefore, the electric field in the electric field direction a101 of the eleventh optical waveguide 104A1 on the outward side is cancelled out by the electric field in the electric field direction a102 of the eleventh optical waveguide 104A2 on the return side, so that the modulation efficiency is reduced.

Similarly, the electric field direction b101 of the twelfth optical waveguide 104B1 on the outward side is the same as the crystal direction (Z direction) of the LN crystal, but the electric field direction b102 of the twelfth optical waveguide 104B2 on the return side is different from the crystal direction (Z direction) of the LN crystal. Further, the electric field direction b101 of the twelfth optical waveguide 104B1 on the outward side is opposite to the electric field direction b102 of the twelfth optical waveguide 104B2 on the return side. Therefore, the electric field in the electric field direction b101 of the twelfth optical waveguide 104B1 on the outward side is cancelled out by the electric field in the electric field direction b102 of the twelfth optical waveguide 104B2 on the return side, so that the modulation efficiency is reduced.

In the optical modulator 100A that is an X-cut LN modulator with single end driving using a single signal electrode, the crystal axis is inverted between the outward path and the return path with respect to the propagation direction (Y direction). As a result, phase changes in opposite directions occur such that a phase change on the outward side is cancelled out by a phase change on the return side, so that the modulation efficiency is reduced.

Further, it may be possible to adopt a method of changing a horizontal positional relationship of optical waveguides between the outward path and the return path in the traveling direction, but an intersecting waveguide for switching between the optical waveguides and a reflection structure using an external mirror induce reflection, attenuation, or the like of an optical signal.

SUMMARY

According to an aspect of an embodiment, an optical device includes an X-cut substrate, a first optical waveguide, a second optical waveguide, a first signal electrode and a second signal electrode. The first optical waveguide and the second optical waveguide are formed on the substrate and have a folding structure. The first signal electrode is arranged on the substrate and generates a first electric field. The second signal electrode is arranged on the substrate and generates a second electric field with a reverse phase as compared to the first electric field. The first optical waveguide includes a first optical waveguide on an outward side to which the first electric field is applied from the first signal electrode; and a first optical waveguide on a return side to which the second electric field is applied from the second signal electrode. The second optical waveguide includes a second optical waveguide on the outward side to which the first electric field is applied from the first signal electrode; and a second optical waveguide on the return side to which the second electric field is applied from the second signal electrode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is an exemplary schematic cross-sectional view of a portion taken along a line D-D in FIG. 12.

DESCRIPTION OF EMBODIMENTS

Preferred embodiments of the present invention will be explained with reference to accompanying drawings. The present invention is not limited by the embodiments below.

[a] First Embodiment

Figure 1:
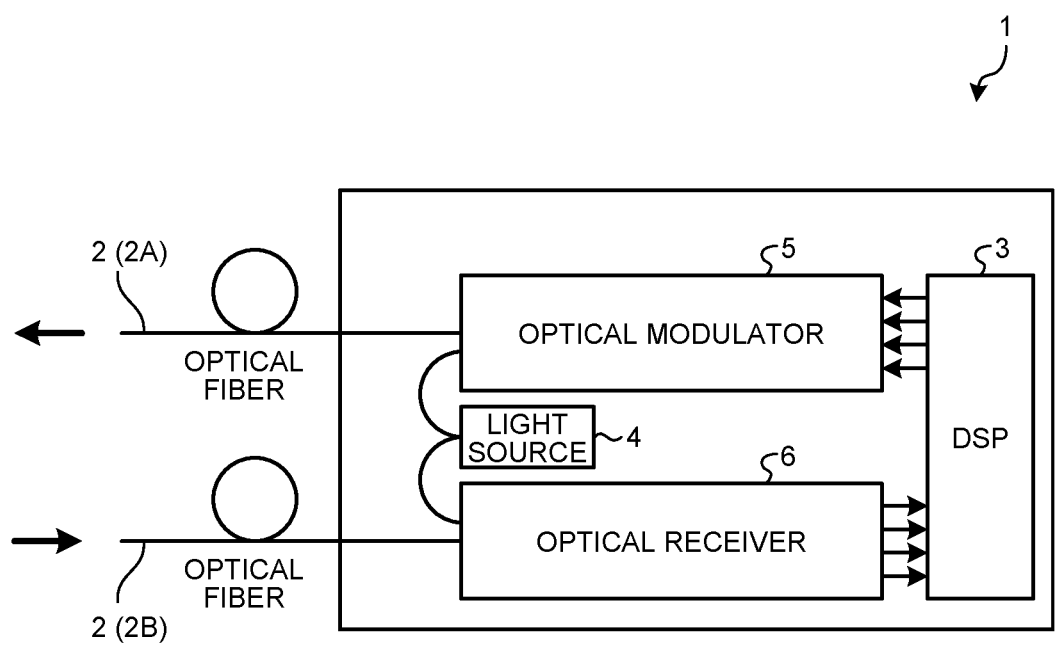
FIG. 1 is a block diagram illustrating an example of a configuration of an optical communication apparatus according to one embodiment.

FIG. 1 is a block diagram illustrating an example of a configuration of an optical communication apparatus 1 according to one embodiment. The optical communication apparatus 1 illustrated in FIG. 1 is connected to an optical fiber 2A (2) on an output side and an optical fiber 2B (2) on an input side. The optical communication apparatus 1 includes a digital signal processor (DSP) 3, a light source 4, an optical modulator 5, and an optical receiver 6. The DSP 3 is an electrical component that performs digital signal processing. The DSP 3 performs a process, such as encoding, on transmission data, generates an electrical signal including the transmission data, and outputs the generated electrical signal to the optical modulator 5, for example. Further, the DSP 3 acquires an electrical signal including reception data from the optical receiver 6, performs a process, such as decoding, on the acquired electrical signal, and obtains reception data.

The light source 4 is, for example, a laser diode or the like, generates light at a predetermined wavelength, and supplies the light to the optical modulator 5 and the optical receiver 6. The optical modulator 5 is an optical device that modulates the light supplied from the light source 4 by using the electrical signal output from the DSP 3, and outputs the obtained optical transmission signal to the optical fiber 2A. The optical modulator 5 is an optical device, such as a lithium niobate (LN) optical modulator that includes an optical waveguide made of LN and a signal electrode having a coplanar waveguide (CPW) structure, for example.

The optical receiver 6 receives an optical signal from the optical fiber 2B and demodulates the received optical signal by using the light supplied from the light source 4. Further, the optical receiver 6 converts the demodulated received optical signal into an electrical signal, and outputs the converted electrical signal to the DSP 3.

Figure 2:
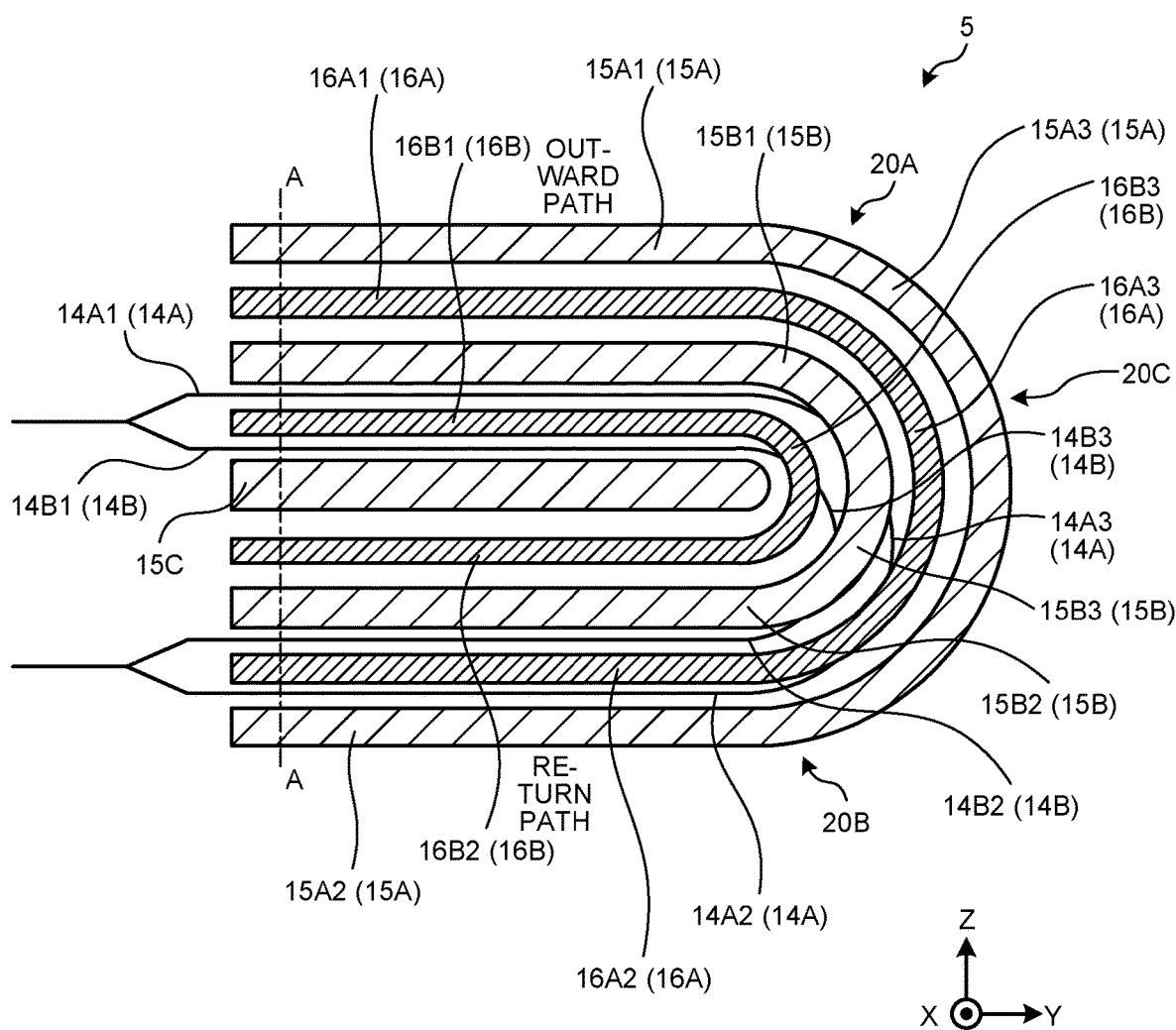
FIG. 2 is a schematic plan view illustrating an example of a configuration of an optical modulator according to a first embodiment.
Figure 3:
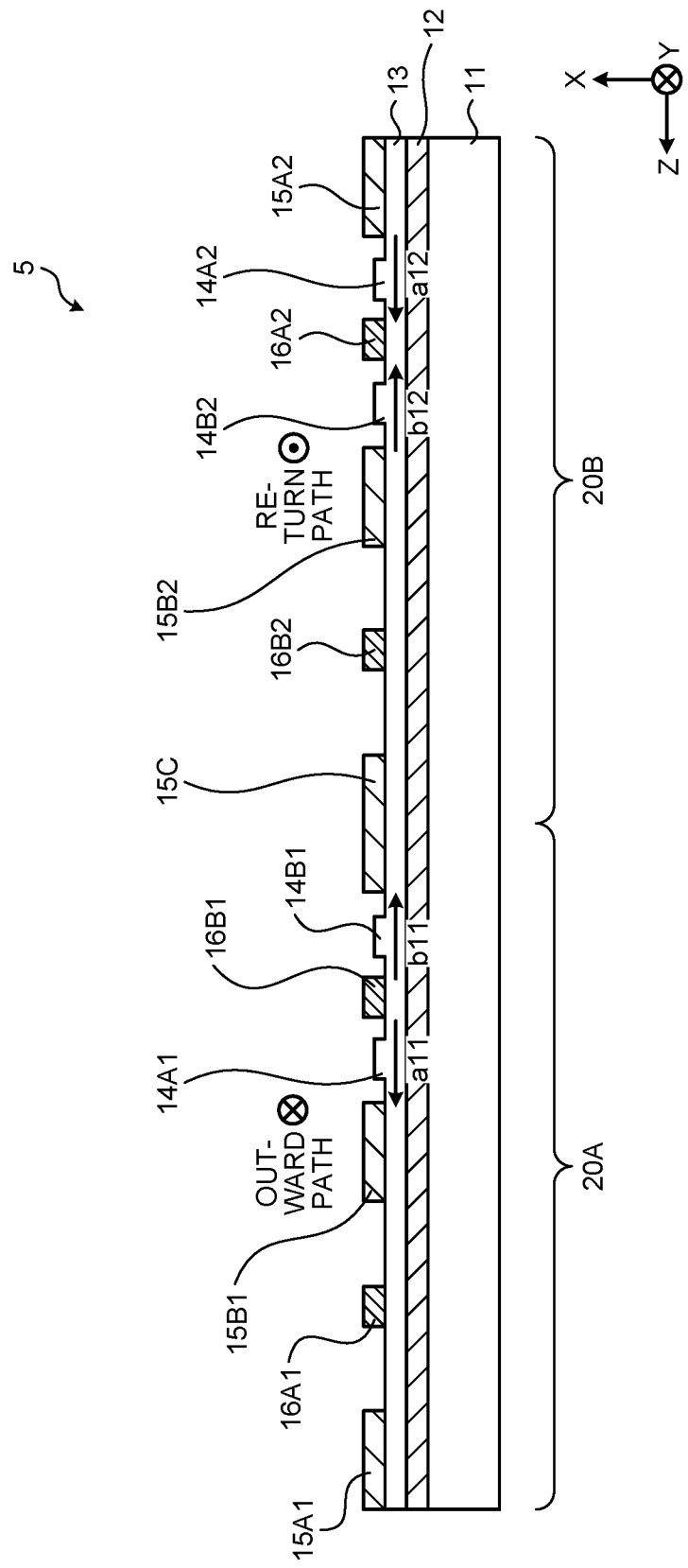
FIG. 3 is an exemplary schematic cross-sectional view of a portion taken along a line A-A in FIG. 2.

FIG. 2 is a schematic plan view illustrating an example of a configuration of the optical modulator 5 according to the first embodiment, and FIG. 3 is an exemplary schematic cross-sectional view of a portion taken along a line A-A in FIG. 2. The optical modulator 5 illustrated in FIG. 2 and FIG. 3 includes a substrate 11, an intermediate layer 12 that is laminated on the substrate 11, and a thin-film LN substrate 13 that is laminated on the intermediate layer 12 and that is made of a LN (LiNbO$_3$) material. Further, the optical modulator 5 includes a first optical waveguide 14A and a second optical waveguide 14B each being formed of the thin-film LN substrate 13 and each having a folding structure that is folded into two, and includes a first ground electrode 15A, a second ground electrode 15B, and a third ground electrode 15C that are formed on the thin-film LN substrate 13. Furthermore, the optical modulator 5 includes a first signal electrode 16A and a second signal electrode 16B that are formed on the thin-film LN substrate 103.

The substrate 11 is a substrate that is made of a certain material, such as silicon dioxide ($SiO_2$), titanium dioxide ($TiO_2$), Si, or LN. The intermediate layer 12 is a layer made of $SiO_2$ or $TiO_2$ that has a low optical refractive index as compared to LN. The thin-film LN substrate 13 is a substrate using a thin film of a LN crystal, and includes predetermined portions at which the first optical waveguide 14A and the second optical waveguide 14B having protruding shapes that protrude upward are formed. With use of the LN material, it is possible to confine light at high intensity and it is advantageous to reduce a device size. The thin-film LN substrate 13 is an X-cut substrate.

The first optical waveguide 14A and the second optical waveguide 14B are formed of the thin-film LN substrate 13 and made of a LN material, and therefore have excellent properties in terms of insertion loss and transmission characteristics, for example. The optical modulator 5 is able to perform chirp-free operation due to structural symmetry, and is suitable for long-distance transmission. The first signal electrode 16A and the second signal electrode 16B are electrodes made of a metal material, such as gold or copper, for example. The first ground electrode 15A, the second ground electrode 15B, and the third ground electrode 15C are electrodes made of a metal material, such as aluminum, for example.

The first signal electrode 16A is arranged on the thin-film LN substrate 13 and generates a first electric field to be applied to the first optical waveguide 14A or the second optical waveguide 14B. The second signal electrode 16B is arranged on the thin-film LN substrate 13 and generates a first electric field to be applied to the first optical waveguide 14A or the second optical waveguide 14B. The second electric field is an electric field in an electric field direction as a reverse phase of an electric field direction of the first electric field.

The optical modulator 5 has a folding structure in which each of the first optical waveguide 14A, the second optical waveguide 14B, the first ground electrode 15A, the second ground electrode 15B, the first signal electrode 16A, and the second signal electrode 16B is folded into an outward path and a return path. The optical modulator 5 includes a first interaction portion 20A on the outward side, a second interaction portion 20B on the return side, and an intermediate portion 20C that connects the first interaction portion 20A on the outward side and the second interaction portion 20B on the return side.

The first optical waveguide 14A having the folding structure includes a first optical waveguide 14A1 on the outward side, a first optical waveguide 14A2 on the return side, and a first optical waveguide 14A3 that is located on an intermediate side and that connects the first optical waveguide 14A1 on the outward side and the first optical waveguide 14A2 on the return side. The second optical waveguide 14B having the folding structure includes a second optical waveguide 14B1 on the outward side, a second optical waveguide 14B2 on the return side, and a second optical waveguide 14B3 that is located on the intermediate side and that connects the second optical waveguide 14B1 on the outward side and the second optical waveguide 14B2 on the return side.

The first ground electrode 15A having the folding structure includes a first ground electrode 15A1 on the outward side, a first ground electrode 15A2 on the return side, and a first ground electrode 15A3 that is located on the intermediate side and that connects the first ground electrode 15A1 on the outward side and the first ground electrode 15A2 on the return side. The second ground electrode 15B having the folding structure includes a second ground electrode 15B1 on the outward side, a second ground electrode 15B2 on the return side, and a second ground electrode 15B3 that is located on the intermediate side and that connects the second ground electrode 15B1 on the outward side and the second ground electrode 15B2 on the return side.

The first signal electrode 16A having the folding structure includes a first signal electrode 16A1 on the outward side, a first signal electrode 16A2 on the return side, and a first signal electrode 16A3 that is located on the intermediate side and that connects the first signal electrode 16A1 on the outward side and the first signal electrode 16A2 on the return side. The second signal electrode 16B having the folding structure includes a second signal electrode 16B1 on the outward side, a second signal electrode 16B2 on the return side, and a second signal electrode 16B3 that is located on the intermediate side and that connects the second signal electrode 16B1 on the outward side and the second signal electrode 16B2 on the return side.

The first interaction portion 20A on the outward side includes the first ground electrode 15A1 on the outward side, the first optical waveguide 14A1 on the outward side, the first signal electrode 16A1 on the outward side, the second ground electrode 15B1 on the outward side, the second optical waveguide 14B1 on the outward side, and the third ground electrode 15C. The first optical waveguide 14A1 on the outward side is arranged between the second ground electrode 15B1 on the outward side and the second signal electrode 16B1 on the outward side. The second optical waveguide 14B1 on the outward side is arranged between the third ground electrode 15C and the second signal electrode 16B1 on the outward side.

The crystal direction of the thin-film LN substrate 13 is the width direction (Z direction) that is perpendicular to the traveling direction (Y direction). An optical refractive index of the first optical waveguide 14A1 on the outward side is changed in accordance with an electric field in the electric field direction a11 from the second signal electrode 16B1 on the outward side to the second ground electrode 15B1 on the outward side. Further, an optical refractive index of the second optical waveguide 14B1 on the outward side is changed in accordance with an electric field in an electric field direction b11 from the second signal electrode 16B1 on the outward side to the third ground electrode 15C.

The intermediate portion 20C includes the first ground electrode 15A3 on the intermediate side, the first signal electrode 16A3 on the intermediate side, the second ground electrode 15B3 on the intermediate side, the first optical waveguide 14A3 on the intermediate side, and the second optical waveguide 14B3 on the intermediate side. Further, the intermediate portion 20C includes the second signal electrode 16B3 on the intermediate side and the third ground electrode 15C.

The second interaction portion 20B on the return side includes the first ground electrode 15A2 on the return side, the first optical waveguide 14A2 on the return side, the first signal electrode 16A2 on the return side, the second optical waveguide 14B2 on the return side, and the second ground electrode 15B2 on the return side. Further, the second interaction portion 20B on the return side includes the second signal electrode 16B2 on the return side and the third ground electrode 15C. The first optical waveguide 14A2 on the return side is arranged between the first ground electrode 15A2 on the return side and the first signal electrode 16A2 on the return side. The second optical waveguide 14B2 on the return side is arranged between the second ground electrode 15B2 on the return side and the first signal electrode 16A2 on the return side.

An optical refractive index of the first optical waveguide 14A2 on the return side is changed in accordance with an electric field in an electric field direction a12 from the first ground electrode 15A2 on the return side to the first signal electrode 16A2 on the return side. Further, an optical refractive index of the second optical waveguide 14B2 on the return side is changed in accordance with an electric field in an electric field direction b12 from the second ground electrode 15B2 on the return side to the first signal electrode 16A2 on the return side.

In other words, in the first optical waveguide 14A, the electric field direction a11 of the electric field to be applied to the first optical waveguide 14A1 on the outward side and the electric field direction a12 of the electric field to be applied to the first optical waveguide 14A2 on the return side are the same as the crystal direction of the thin-film LN substrate 13. Further, in the second optical waveguide 14B, the electric field direction b11 of the electric field to be applied to the second optical waveguide 14B1 on the outward side and the electric field direction b12 of the electric field to be applied to the second optical waveguide 14B2 on the return side are the same as the crystal direction of the thin-film LN substrate 13.

In the optical modulator 5 of the first embodiment, the first optical waveguide 14A1 on the outward side is arranged between the second ground electrode 15B1 on the outward side and the second signal electrode 16B1 on the outward side, and the second optical waveguide 14B1 on the outward side is arranged between the second signal electrode 16B1 on the outward side and the third ground electrode 15C. Further, in the optical modulator 5, the first optical waveguide 14A2 on the return side is arranged between the first ground electrode 15A2 on the return side and the first signal electrode 16A2 on the return side, and the second optical waveguide 14B2 on the return side is arranged between the first signal electrode 16A2 on the return side and the second ground electrode 15B2 on the return side. As a result, in the first optical waveguide 14A, the electric field direction a11 of the electric field to be applied to the first optical waveguide 14A1 on the outward side and the electric field direction a12 of the electric field to be applied to the first optical waveguide 14A2 on the return side are the same, so that the modulation efficiency is improved. Similarly, in the second optical waveguide 14B, the electric field direction b11 of the electric field to be applied to the second optical waveguide 14B1 on the outward side and the electric field direction b12 of the electric field to be applied to the second optical waveguide 14B2 on the return side are the same, so that the modulation efficiency is improved.

Further, as for the crystal direction of the X-cut substrate, the direction a11 of the first electric field to be applied to the first optical waveguide 14A1 on the outward side and the direction a12 of the second electric field to be applied to the first optical waveguide 14A2 on the return side are the same. As a result, the orientation of the electric field to be applied from the signal electrode to the corresponding optical waveguide is the same between the folded paths, that is, between the outward path and the return path, with respect to an Z axis of the LN crystal, so that it is possible to maintain the modulation efficiency and simultaneously reduce the device size by reducing a length of the interaction portion. Further, it is possible to prevent reflection, attenuation, or the like of an optical signal in the folding portion without a need of intersection of optical waveguides and a reflection structure using an external mirror.

On the outward path, the first optical waveguide 14A is located on the positive Z side and the second optical waveguide 14B is located on the negative Z size with respect to the Z-axis direction of the LN crystal Z. On the return path, the first optical waveguide 14A is located on the negative Z side and the second optical waveguide 14B is located on the positive Z side. Therefore, the Z-axis direction of the LN crystal and the orientation of the electric field that is applied in the direction from the single signal electrode to the ground electrode are not changed between the outward path and the return path. As a result, the orientation of the electric field applied from the signal electrode to the corresponding optical waveguide is the same direction between the outward path and the return path with respect to the Z axis of the LN crystal, so that it is possible to reduce the length of the interaction portion while maintaining the modulation efficiency.

[b] Second Embodiment

Figure 4:
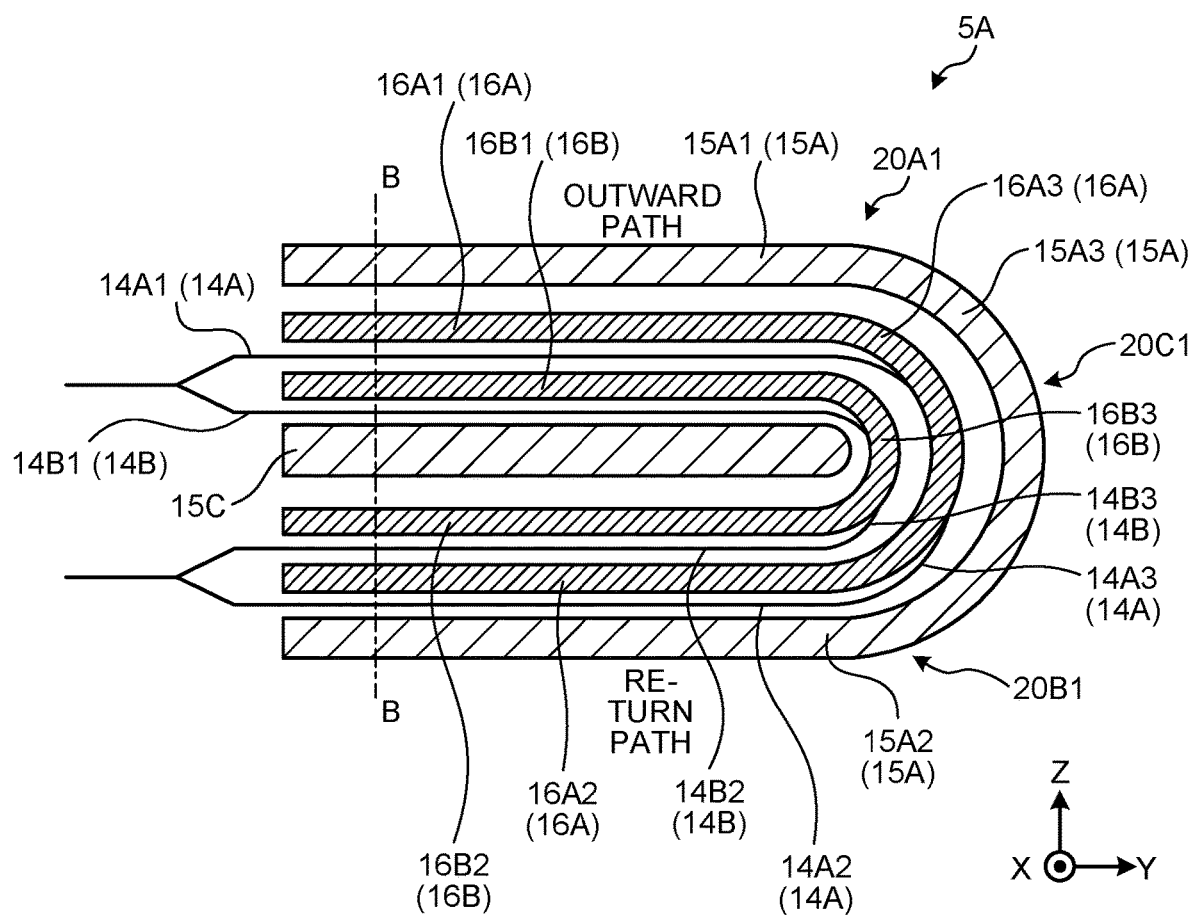
FIG. 4 is a schematic plan view illustrating an example of a configuration of an optical modulator according to a second embodiment.
Figure 5:
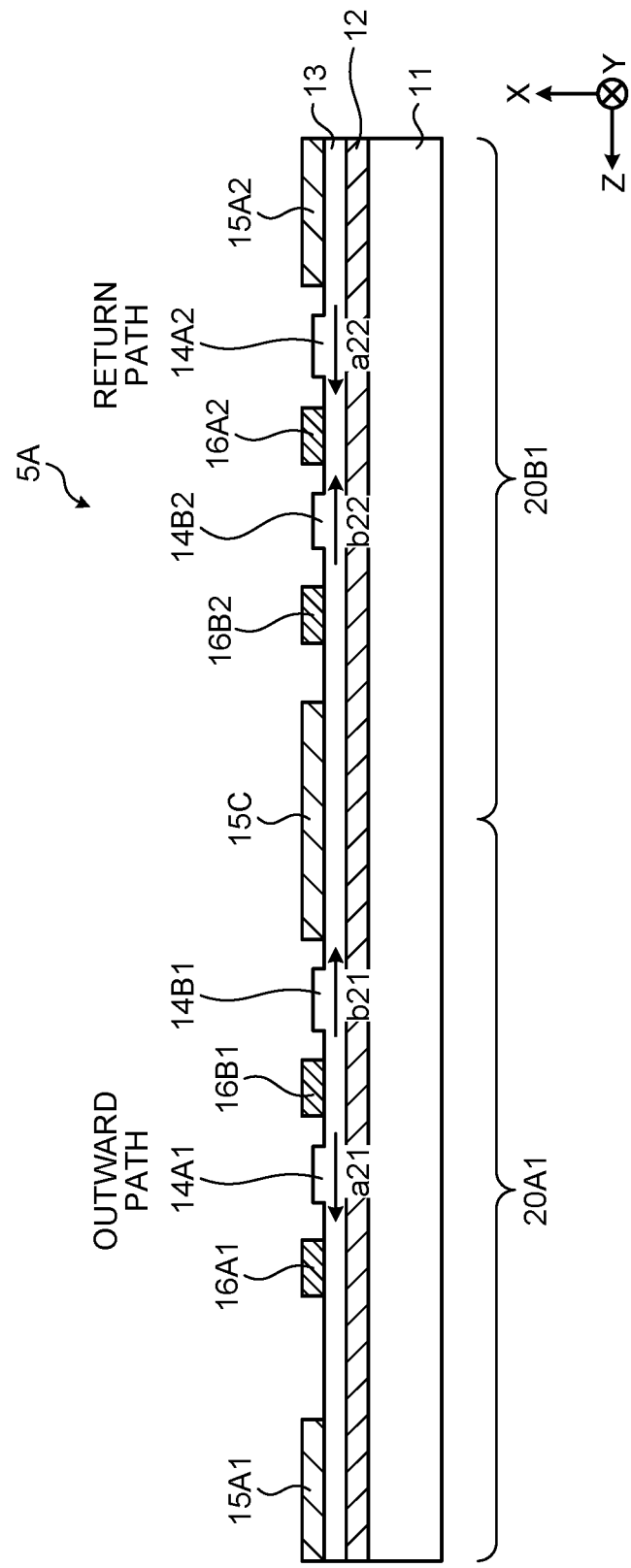
FIG. 5 is an exemplary schematic cross-sectional view of a portion taken along a line B-B in FIG. 4.

FIG. 4 is a schematic plan view illustrating an example of a configuration of an optical modulator 5A according to a second embodiment, and FIG. 5 is an exemplary schematic cross-sectional view of a portion taken along a line B-B in FIG. 4. Meanwhile, the same components as those of the optical modulator 5 of the first embodiment are denoted by the same reference symbols, and explanation of the same configuration and operation will be omitted.

The optical modulator 5A illustrated in FIG. 4 and FIG. 5 includes the substrate 11, the intermediate layer 12, the thin-film LN substrate 13, and the two optical waveguides, that is, the first optical waveguide 14A and the second optical waveguide 14B. Further, the optical modulator 5A includes the first ground electrode 15A and the third ground electrode 15C that are formed on the thin-film LN substrate 13, and the first signal electrode 16A and the second signal electrode 16B that are formed on the thin-film LN substrate 103. Meanwhile, the optical modulator 5A of the second embodiment is different from the optical modulator 5 of the first embodiment in that the second ground electrode 15B is not arranged between the first signal electrode 16A and the second signal electrode 16B.

The optical modulator 5A includes a first interaction portion 20A1 on the outward side, a second interaction portion 20B1 on the return side, and an intermediate portion 20C1 that connects the first interaction portion 20A1 on the outward side and the second interaction portion 20B1 on the return side. The first interaction portion 20A1 on the outward side includes the first ground electrode 15A1 on the outward side, the first signal electrode 16A1 on the outward side, the first optical waveguide 14A1 on the outward side, the second signal electrode 16B1 on the outward side, the second optical waveguide 14B1 on the outward side, and the third ground electrode 15C. The first optical waveguide 14A1 on the outward side is arranged between the first signal electrode 16A1 on the outward side and the second signal electrode 16B1 on the outward side. The second optical waveguide 14B1 on the outward side is arranged between the third ground electrode 15C and the second signal electrode 16B1 on the outward side.

The crystal direction of the thin-film LN substrate 13 is the width direction (Z direction) perpendicular to the traveling direction (Y direction). An optical refractive index of the first optical waveguide 14A1 on the outward side is changed in accordance with an electric field in an electric field direction a21 from the second signal electrode 16B1 on the outward side to the first signal electrode 16A1 on the outward side. Further, an optical refractive index of the second optical waveguide 14B1 on the outward side is changed in accordance with an electric field in an electric field direction b21 from the second signal electrode 16B1 on the outward side to the third ground electrode 15C.

The intermediate portion 20C1 includes the first ground electrode 15A3 on the intermediate side, the first signal electrode 16A3 on the intermediate side, the first optical waveguide 14A3 on the intermediate side, the second optical waveguide 14B3 on the intermediate side, the second signal electrode 16B3 on the intermediate side, and the third ground electrode 15C.

The second interaction portion 20B1 on the return side includes the first ground electrode 15A2 on the return side, the first optical waveguide 14A2 on the return side, the first signal electrode 16A2 on the return side, the second optical waveguide 14B2 on the return side, the second signal electrode 16B2 on the return side, and the third ground electrode 15C. The first optical waveguide 14A2 on the return side is arranged between the first ground electrode 15A2 on the return side and the first signal electrode 16A2 on the return side. The second optical waveguide 14B2 on the return side is arranged between the second signal electrode 16B2 on the return side and the first signal electrode 16A2 on the return side.

An optical refractive index of the first optical waveguide 14A2 on the return side is changed in accordance with an electric field in an electric field direction a22 from the first signal electrode 16A2 on the return side to the first ground electrode 15A2 on the return side. Further, an optical refractive index of the second optical waveguide 14B2 on the return side is changed in accordance with an electric field in an electric field direction b22 from the second signal electrode 16B2 on the return side to the first signal electrode 16A2 on the return side.

In other words, in the first optical waveguide 14A, the electric field direction a21 of the electric field to be applied to the first optical waveguide 14A1 on the outward side and the electric field direction a22 of the electric field to be applied to the first optical waveguide 14A2 on the return side are the same as the crystal direction of the thin-film LN substrate 13. Further, in the second optical waveguide 14B, the electric field direction b21 of the electric field to be applied to the second optical waveguide 14B1 on the outward side and the electric field direction b22 of the electric field to be applied to the second optical waveguide 14B2 on the return side are the same as the crystal direction of the thin-film LN substrate 13.

In the optical modulator 5A of the second embodiment, the first optical waveguide 14A1 on the outward side is arranged between the first signal electrode 16A1 on the outward side and the second signal electrode 16B1 on the outward side, and the second optical waveguide 14B1 on the outward side is arranged between the second signal electrode 16B1 on the outward side and the third ground electrode 15C. Further, in the optical modulator 5A, the first optical waveguide 14A2 on the return side is arranged between the first ground electrode 15A2 on the return side and the first signal electrode 16A2 on the return side, and the second optical waveguide 14B2 on the return side is arranged between the first signal electrode 16A2 on the return side and the second signal electrode 16B2 on the return side. As a result, in the first optical waveguide 14A, the electric field direction a21 of the electric field to be applied to the first optical waveguide 14A1 on the outward side and the electric field direction a22 of the electric field to be applied to the first optical waveguide 14A2 on the return side are the same, so that the modulation efficiency is improved. Similarly, in the second optical waveguide 14B, the electric field direction b21 of the electric field to be applied to the second optical waveguide 14B1 on the outward side and the electric field direction b22 of the electric field to be applied to the second optical waveguide 14B2 on the return side are the same, so that the modulation efficiency is improved. Further, because the second ground electrode 15B is not arranged between the first optical waveguide 14A and the second optical waveguide 14B, it is possible to reduce a width in the Z-axis direction and reduce a device size.

[c] Third Embodiment

Figure 6:
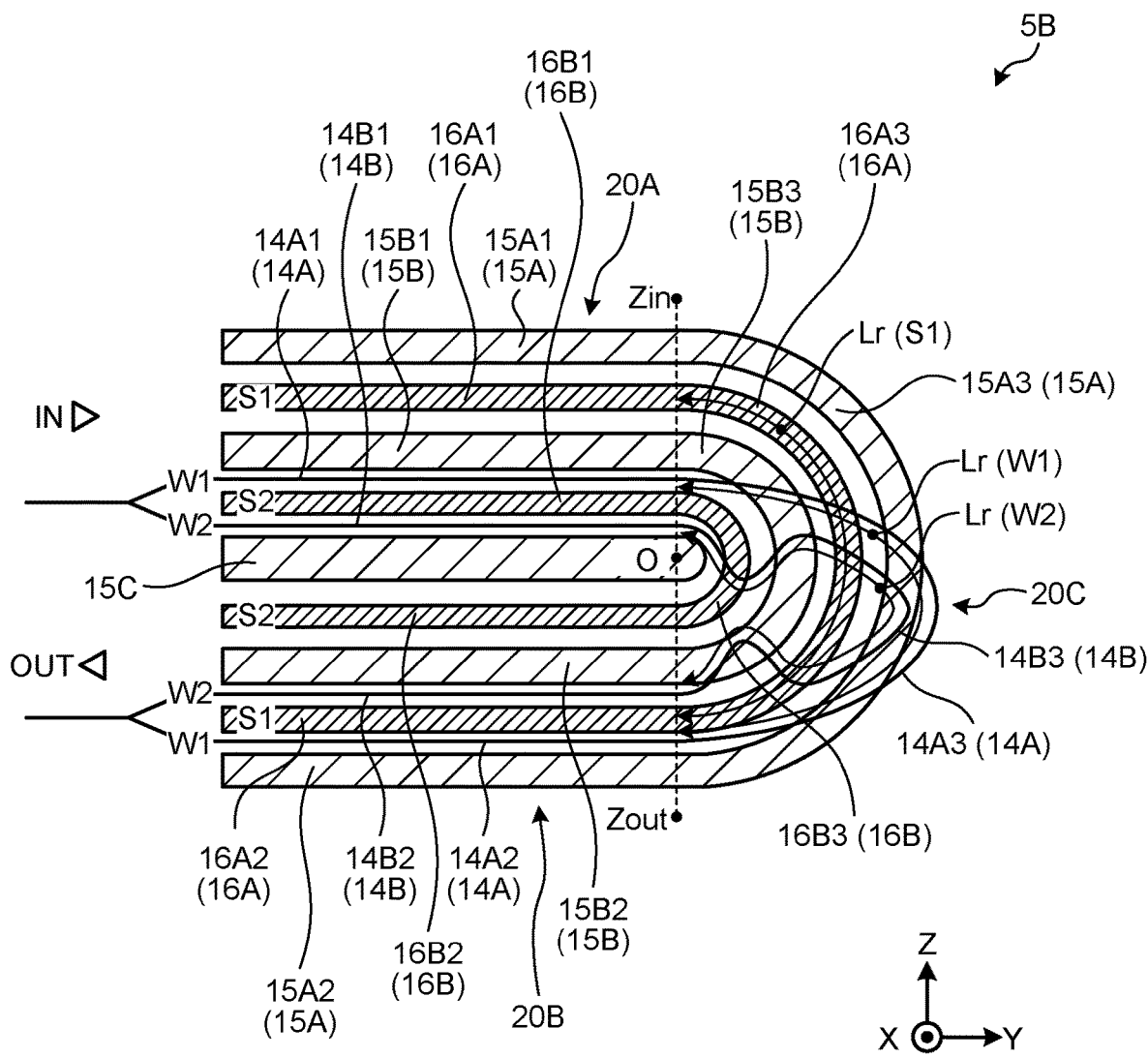
FIG. 6 is a schematic plan view illustrating an example of a configuration of an optical modulator according to a third embodiment.

FIG. 6 is a schematic plan view illustrating an example of a configuration of an optical modulator 5B according to a third embodiment. Meanwhile, the same components as those of the optical modulator 5 of the first embodiment are denoted by the same reference symbols, and explanation of the same configuration and operation will be omitted. The optical modulator 5B illustrated in FIG. 6 includes the first interaction portion 20A on the outward side, the second interaction portion 20B on the return side, and the intermediate portion 20C that connects the first interaction portion 20A on the outward side and the second interaction portion 20B on the return side. The intermediate portion 20C is a portion from an O-Zin surface to O-Zout surface illustrated in FIG. 6.

An optical waveguide length of the first optical waveguide 14A3 on the intermediate side and an optical waveguide length of the second optical waveguide 14B3 on the intermediate side are adjusted such that the optical waveguide length of the first optical waveguide 14A and the optical waveguide length of the second optical waveguide 14B become the same. Meanwhile, for convenience of explanation, as illustrated in FIG. 6, the first optical waveguide 14A3 on the intermediate side and the second optical waveguide 14B3 on the intermediate side are illustrated as being located on the first signal electrode 16A, the second signal electrode 16B, the first ground electrode 15A, and the second ground electrode 15B such that the optical waveguide lengths are clarified. A length of the first signal electrode 16A3 on the intermediate side from the O-Zin surface to the O-Zout surface is Lr(S1). A waveguide length of the first optical waveguide 14A3 on the intermediate side is a length Lr(W1) from the O-Zin surface to the O-Zout surface. A waveguide length of the second optical waveguide 14B3 on the intermediate side is a length Lr(W2) from the O-Zin surface to the O-Zout surface. By setting the lengths such that Lr(S1)=Lr(W2)=Lr(W1), the optical waveguide length of the first optical waveguide 14A, the optical waveguide length of the second optical waveguide 14B, and an electrode length of the first signal electrode 16A are set to the same length. Meanwhile, shapes of the first optical waveguide 14A3 on the intermediate side and the second optical waveguide 14B3 on the intermediate side may be changed appropriately. As a result, it is possible to set the same phase between the outward path and the return path and realize wideband operation. Further, because the waveguide length of the first optical waveguide 14A and the waveguide length of the second optical waveguide 14B are set to the same length, it is possible to prevent a propagation loss difference between the first optical waveguide 14A and the second optical waveguide 14B, so that it is possible to improve an extinction ratio and wavelength dependence of the optical modulator 5B.

In the optical modulator 5B of the third embodiment, the optical waveguide length of the first optical waveguide 14A3 on the intermediate side and the optical waveguide length of the second optical waveguide 14B3 on the intermediate side are adjusted such that the optical waveguide length of the first optical waveguide 14A and the optical waveguide length of the second optical waveguide 14B become the same. As a result, the optical waveguide length of the first optical waveguide 14A and the optical waveguide length of the second optical waveguide 14B are set to the same length, so that it is possible to prevent a propagation loss difference between the optical waveguides and it is possible to improve the extinction ratio and the wavelength dependence of the optical modulator 5B.

[d] Fourth Embodiment

Figure 7:
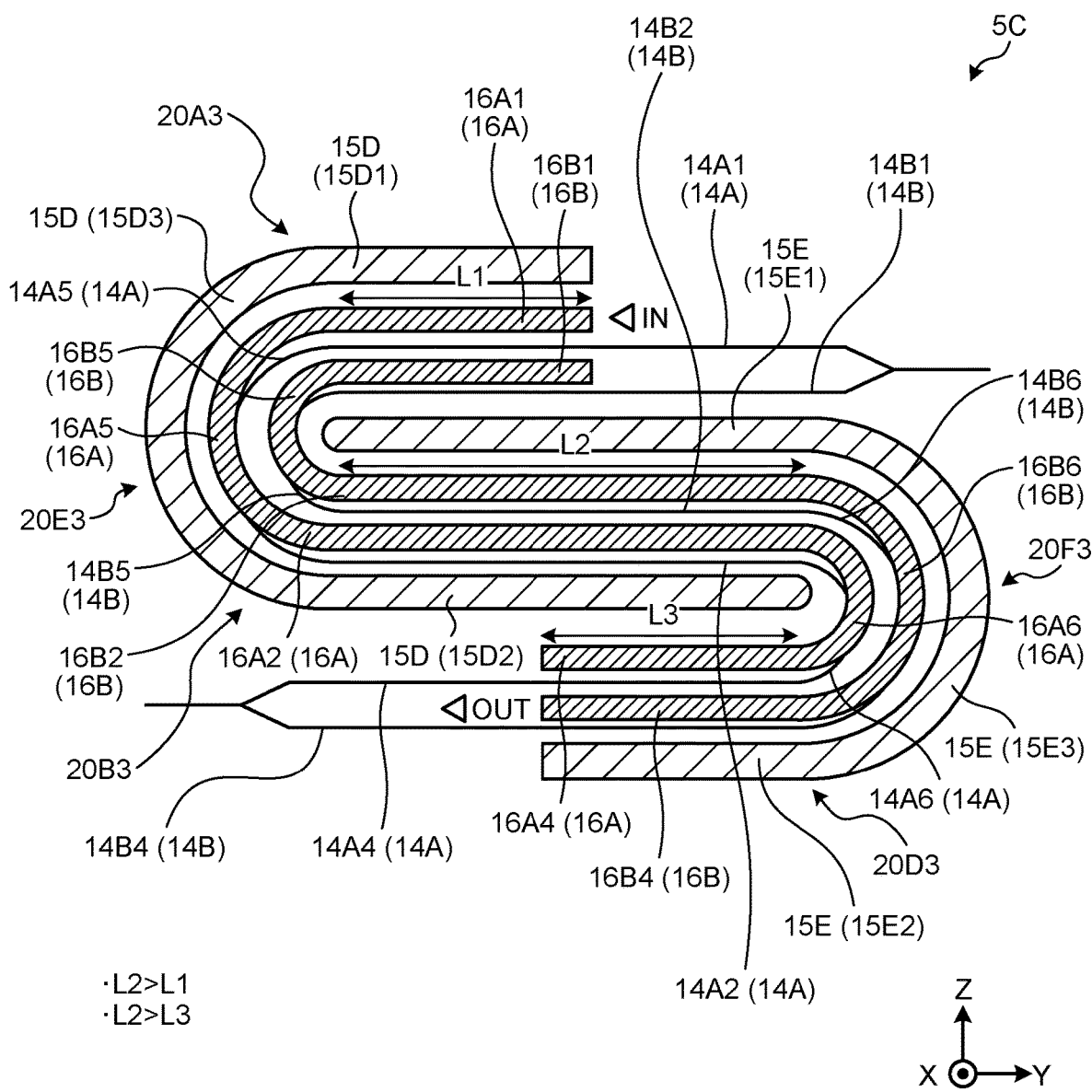
FIG. 7 is a schematic plan view illustrating an example of a configuration of an optical modulator according to a fourth embodiment.

FIG. 7 is a schematic plan view illustrating an example of a configuration of an optical modulator 5C according to a fourth embodiment. Meanwhile, the same components as those of the optical modulator 5 of the first embodiment are denoted by the same reference symbols, and explanation of the same configuration and operation will be omitted. The optical modulator 5C illustrated in FIG. 7 includes the substrate 11, the intermediate layer 12, the thin-film LN substrate 13, the first optical waveguide 14A, the second optical waveguide 14B, the first signal electrode 16A, and the second signal electrode 16B. Further, the optical modulator 5C includes a fourth ground electrode 15D and a fifth ground electrode 15E that have folding structures, instead of the first ground electrode 15A, the second ground electrode 15B, and the third ground electrode 15C.

The first optical waveguide 14A having a folding structure that is folded at two portions includes the first optical waveguide 14A1 on a first outward side, the first optical waveguide 14A2 on the return side, a first optical waveguide 14A4 on a second outward side. Further, the first optical waveguide 14A includes a first optical waveguide 14A5 that is located on a first intermediate side and that connects the first optical waveguide 14A1 on the first outward side and the first optical waveguide 14A2 on the return side. Further, the first optical waveguide 14A includes a first optical waveguide 14A6 that is located on a second intermediate side and that connects the first optical waveguide 14A2 on the return side and the first optical waveguide 14A4 on the second outward side.

The second optical waveguide 14B having a folding structure that is folded at two portions includes the second optical waveguide 14B1 on a first outward side, the second optical waveguide 14B2 on the return side, and a second optical waveguide 14B4 on a second outward side. Further, the second optical waveguide 14B includes a second optical waveguide 14B5 that is located on a first intermediate side and that connects the second optical waveguide 14B1 on the first outward side and the second optical waveguide 14B2 on the return side. Further, the second optical waveguide 14B includes a second optical waveguide 14B6 that is located on a second intermediate side and that connects the second optical waveguide 14B2 on the return side and the second optical waveguide 14B4 on the second outward side.

The first signal electrode 16A having a folding structure that is folded at two portions includes the first signal electrode 16A1 on a first outward side, the first signal electrode 16A2 on the return side, and a first signal electrode 16A4 on a second outward side includes. Further, the first signal electrode 16A includes a first signal electrode 16A5 that is located on a first intermediate side and that connects the first signal electrode 16A1 on the first outward side and the first signal electrode 16A2 on the return side. Further, the first signal electrode 16A includes a first signal electrode 16A6 that is located on a second intermediate side and that connects the first signal electrode 16A2 on the return side and the first signal electrode 16A4 on the second outward side.

The second signal electrode 16B having a folding structure that is folded at two portions includes the second signal electrode 16B1 on a first outward side, the second signal electrode 16B2 on the return side, and a second signal electrode 16B4 on a second outward side. Further, the second signal electrode 16B includes a second signal electrode 16B5 that is located on a first intermediate side and that connects the second signal electrode 16B1 on the first outward side and the second signal electrode 16B2 on the return side. The second signal electrode 16B includes a second signal electrode 16B6 that is located on a second intermediate side and that connects the second signal electrode 16B2 on the return side and the second signal electrode 16B4 on the second outward side.

The fourth ground electrode 15D includes a fourth ground electrode 15D1 on the outward side, a fourth ground electrode 15D2 on the return side, and a fourth ground electrode 15D3 between the fourth ground electrode 15D1 on the outward side and the fourth ground electrode 15D2 on the return side. The fifth ground electrode 15E includes a fifth ground electrode 15E1 on the outward side, a fifth ground electrode 15E2 on the return side, a fifth ground electrode 15E3 between the fifth ground electrode 15E1 on the outward side and the fifth ground electrode 15E2 on the return side.

The optical modulator 5C includes a first interaction portion 20A3, a second interaction portion 20B3, a third interaction portion 20D3, and a second intermediate portion 20E3 that connects the first interaction portion 20A3 and the second interaction portion 20B3. Further, the optical modulator 5C includes a second intermediate portion 20F3 that connects the second interaction portion 20B3 and the third interaction portion 20D3.

The first interaction portion 20A3 includes the fourth ground electrode 15D1 on the outward side, the first signal electrode 16A1 on the first outward side, the first optical waveguide 14A1 on the first outward side, and the second signal electrode 16B1 on the first outward side. The first interaction portion 20A3 includes the second optical waveguide 14B1 on the first outward side and the fifth ground electrode 15E1 on the outward side. The first optical waveguide 14A1 on the first outward side is arranged between the first signal electrode 16A1 on first the outward side and the second signal electrode 16B1 on the first outward side. The second optical waveguide 14B1 on the first outward side is arranged between the second signal electrode 16B1 on the first outward side and the fifth ground electrode 15E1 on the outward side.

The crystal direction of the thin-film LN substrate 13 is the width direction (Z direction) that is perpendicular to the traveling direction (Y direction). An optical refractive index of the first optical waveguide 14A1 on the first outward side in the first interaction portion 20A3 is changed in accordance with an electric field in an electric field direction a31 from the second signal electrode 16B1 on the first outward side to the first signal electrode 16A1 on the first outward side. Further, an optical refractive index of the second optical waveguide 14B1 on the first outward side is changed in accordance with an electric field in an electric field direction b31 from the second signal electrode 16B1 on the first outward side to the fifth ground electrode 15E1 on the outward side.

The second intermediate portion 20E3 includes the fourth ground electrode 15D3 on the intermediate side, the first signal electrode 16A5 on the first intermediate side, the first optical waveguide 14A5 on the first intermediate side, the second optical waveguide 14B5 on the first intermediate side, and the second signal electrode 16B5 on the first intermediate side.

The second interaction portion 20B3 includes the fifth ground electrode 15E1 on the outward side, the second signal electrode 16B2 on the return side, the second optical waveguide 14B2 on the return side, the first signal electrode 16A2 on the return side, the first optical waveguide 14A2 on the return side, and the fourth ground electrode 15D2 on the return side. The first optical waveguide 14A2 on the return side is arranged between the fourth ground electrode 15D2 on the return side and the first signal electrode 16A2 on the return side. The second optical waveguide 14B2 on the return side is arranged between the first signal electrode 16A2 on the return side and the second signal electrode 16B2 on the return side.

An optical refractive index of the first optical waveguide 14A2 on the return side in the second interaction portion 20B3 is changed in accordance with an electric field in an electric field direction a32 from the fourth ground electrode 15D2 on the return side to the first signal electrode 16A2 on the return side. Further, an optical refractive index of the second optical waveguide 14B2 on the return side is changed in accordance with an electric field in an electric field direction b32 from the second signal electrode 16B2 on the return side to the first signal electrode 16A2 on the return side.

The second intermediate portion 20F3 includes the fifth ground electrode 15E3 on the intermediate side, the first signal electrode 16A6 on the second intermediate side, the first optical waveguide 14A6 on the second intermediate side, the second optical waveguide 14B6 on the second intermediate side, and the second signal electrode 16B6 on the second intermediate side.

The third interaction portion 20D3 includes the fourth ground electrode 15D2 on the return side, the first signal electrode 16A4 on the second outward side, the first optical waveguide 14A4 on the second outward side, and the second signal electrode 16B4 on the second outward side. The third interaction portion 20D3 includes the second optical waveguide 14B4 on the second outward side and the fifth ground electrode 15E2 on the return side. The first optical waveguide 14A4 on the second outward side is arranged between the first signal electrode 16A4 on the second outward side and the second signal electrode 16B4 on the second outward side. The second optical waveguide 14B4 on the second outward side is arranged between the second signal electrode 16B4 on the second outward side and the fifth ground electrode 15E2 on the return side.

An optical refractive index of the first optical waveguide 14A4 on the second outward side in the third interaction portion 20D3 is changed in accordance with an electric field in an electric field direction a33 from the second signal electrode 16B4 on the second outward side to the first signal electrode 16A4 on the second outward side. Further, an optical refractive index of the second optical waveguide 14B4 on the second outward side is changed in accordance with an electric field in an electric field direction b33 from the second signal electrode 16B4 on the second outward side to the fifth ground electrode 15E2 on the return side.

In the first optical waveguide 14A, the electric field direction a31 from the second signal electrode 16B1 on the first outward side to the first signal electrode 16A1 on the first outward side, the electric field direction a32 from the second signal electrode 16B1 on the first outward side to the first signal electrode 16A1 on the first outward side, and the electric field direction a32 from the fourth ground electrode 15D2 on the return side to the first signal electrode 16A2 on the return side are the same directions. Further, in the second optical waveguide 14B, the electric field direction b31 from the second signal electrode 16B1 on the first outward side to the fifth ground electrode 15E1 on the outward side, the electric field direction b32 from the second signal electrode 16B2 on the return side to the first signal electrode 16A2 on the return side, and the electric field direction b33 from the second signal electrode 16B4 on the second outward side to the fifth ground electrode 15E2 on the return side are the same directions.

An optical waveguide length L2 of the first optical waveguide 14A2 on the return side in the second interaction portion 20B is set to be longer than an optical waveguide length L3 of the first optical waveguide 14A1 on the first outward side in the first interaction portion 20A or an optical waveguide length L3 of the first optical waveguide 14A4 on the second outward side. The optical waveguide length L2 of the second optical waveguide 14B2 on the return side in the second interaction portion 20B is set to be longer than the optical waveguide length L1 of the second optical waveguide 14B1 on the first outward side in a third interaction portion 20D or the optical waveguide length L1 of the second optical waveguide 14B4 on the second outward side.

In the optical modulator 5A having a folding structure that is folded at a single portion, if electric field efficiency between the signal electrodes and electric field efficiency between the signal electrode and the ground electrode are different, an electrical signal is attenuated along with propagation. Therefore, in the optical modulator 5A, a phase variation amount applied to the first optical waveguide 14A and the second optical waveguide 14B is different between the outward path and the return path, so that frequency dependence of a chirp may occur in some cases. To cope with this, in the optical modulator 5C of the fourth embodiment, the first interaction portion 20A, the second interaction portion 20B, and the third interaction portion 20D are arranged at three positions in the two folded portions in the folding structure. The optical waveguide length L2 of the second interaction portion 20B is set to be longer than the optical waveguide length L3 of the first interaction portion 20A. The optical waveguide length L2 of the second interaction portion 20B is set to be longer than the optical waveguide length L1 of the third interaction portion 20D. As a result, it is possible to set the same phase variation amount between the first optical waveguide 14A and the second optical waveguide 14B and reduce the frequency dependence of the chirp.

[e] Fifth Embodiment

Figure 8:
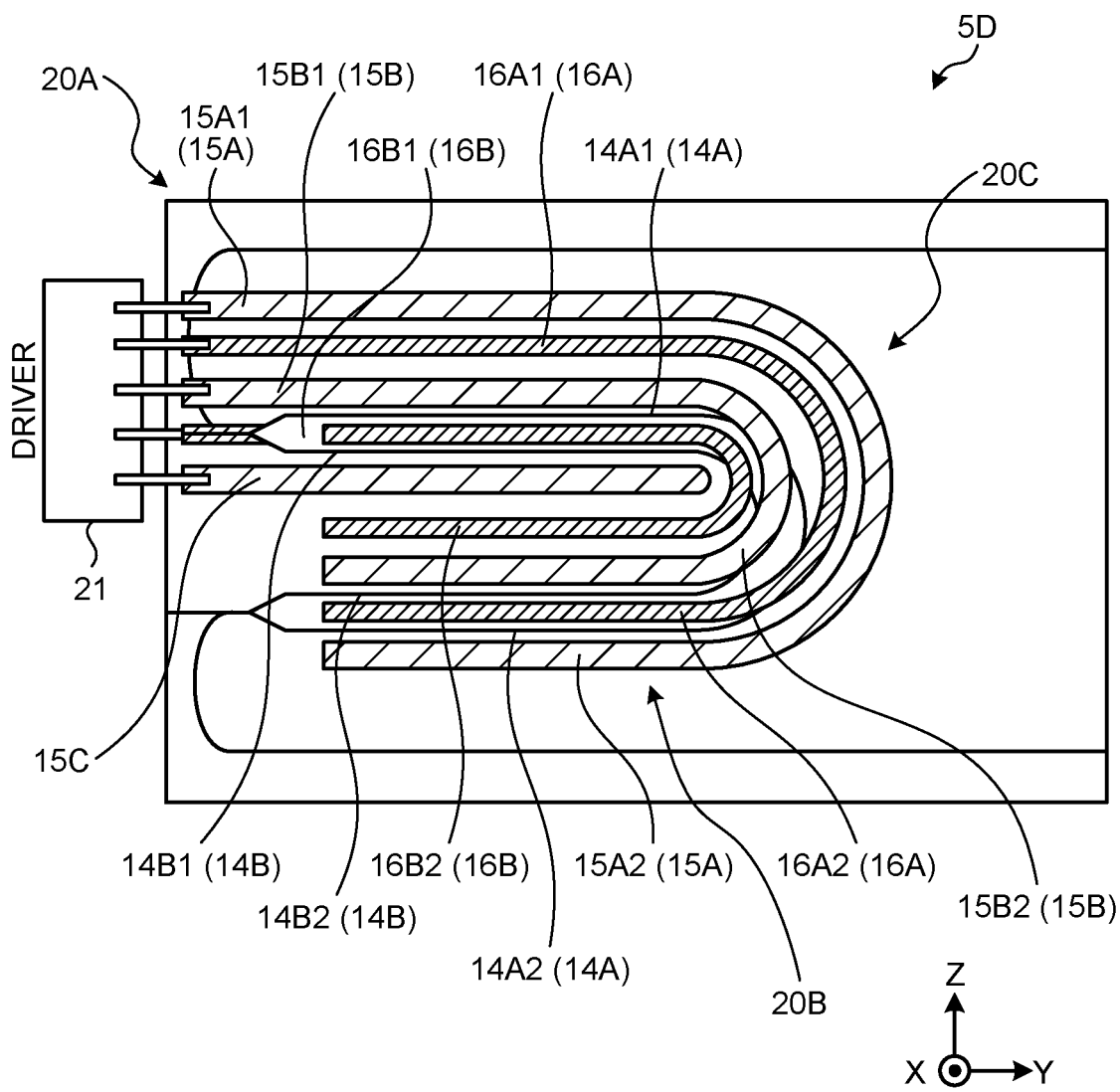
FIG. 8 is a schematic plan view illustrating an example of a configuration of an optical modulator according to a fifth embodiment.

FIG. 8 is a schematic plan view illustrating an example of a configuration of an optical modulator 5D according to a fifth embodiment. Meanwhile, the same components as those of the optical modulator 5 of the first embodiment are denoted by the same reference symbols, and explanation of the same configuration and operation will be omitted.

The optical modulator 5D illustrated in FIG. 8 is configured such that a driver 21 is electrically connected to the optical modulator 5 illustrated in FIG. 2. The driver 21 illustrated in FIG. 8 is connected to the first signal electrode 16A1 on the outward side and the second signal electrode 16B1 on the outward side in the optical modulator 5 illustrated in FIG. 2, by Au wires. Further, the driver 21 is connected to the first ground electrode 15A1 on the outward side, the second ground electrode 15B1 on the outward side, and the third ground electrode 15C by Au wires. The driver 21 amplifies an electrical signal and applies the amplified electrical signal to the first signal electrode 16A and the second signal electrode 16B. The driver 21 is electrically connected to the vicinity of one side of a chip of the optical modulator 5D by the Au wires.

In the optical modulator 5D of the fifth embodiment, due to the electrical connection to the vicinity of the one side of the chip using the Au wires, it is possible to achieve the connection in a short distance and in an efficient manner.

[f] Sixth Embodiment

Figure 9:
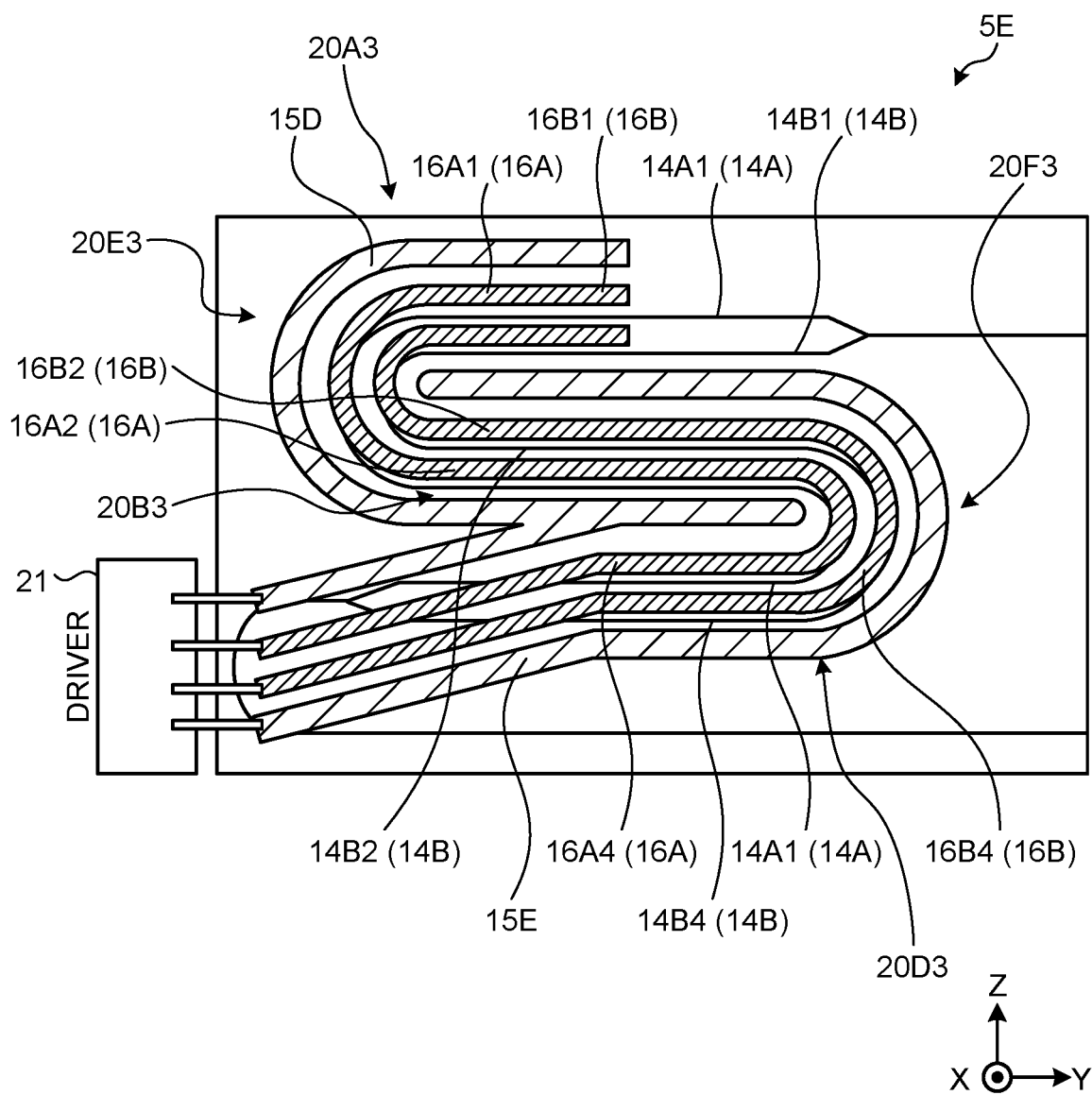
FIG. 9 is a schematic plan view illustrating an example of a configuration of an optical modulator according to a sixth embodiment.
Figure 10:
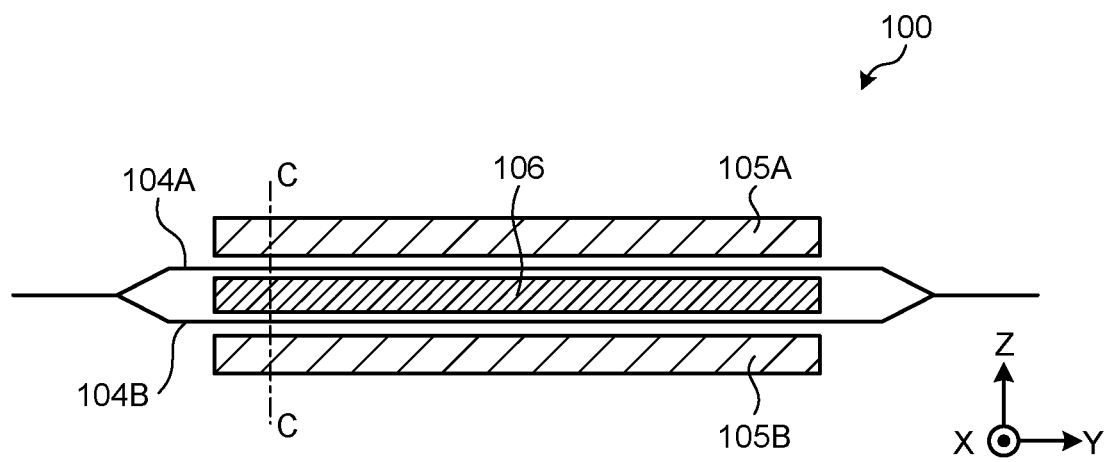
FIG. 10 is a schematic plan view illustrating an example of a configuration of an optical modulator.
Figure 11:
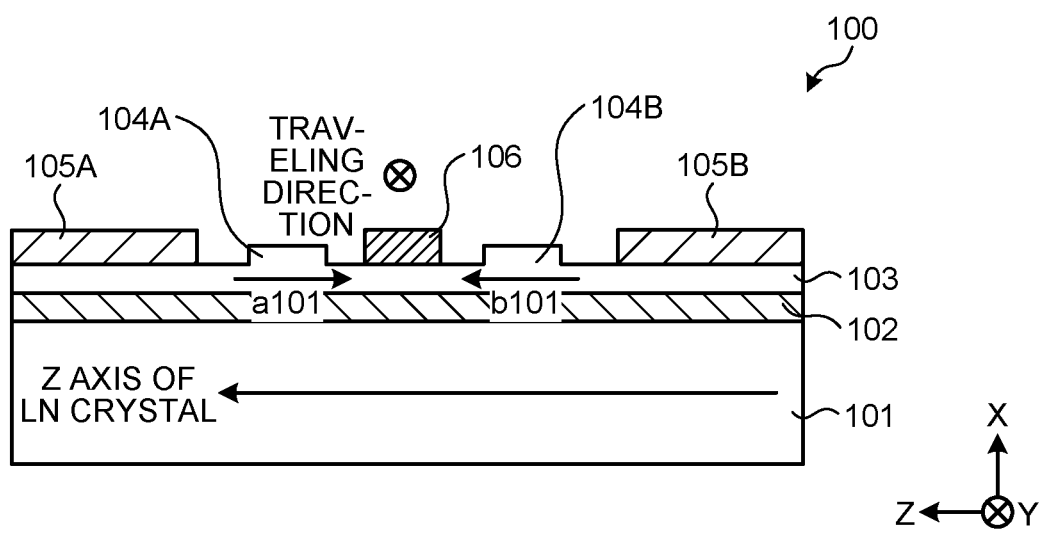
FIG. 11 is an exemplary schematic cross-sectional view of a portion taken along a line C-C in FIG. 10.
Figure 12:
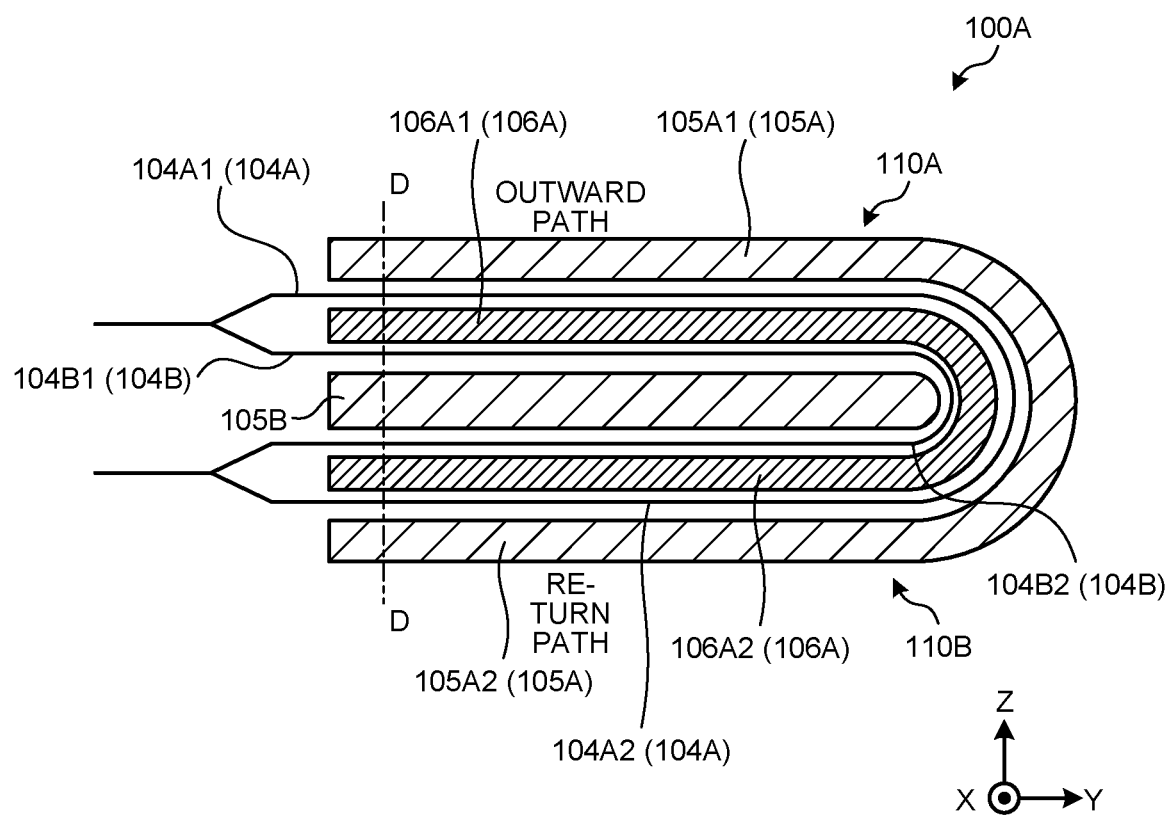
FIG. 12 is a schematic plan view illustrating an example of a configuration of an optical modulator having a folding structure.

FIG. 9 is a schematic plan view illustrating an example of a configuration of an optical modulator 5E according to a sixth embodiment. Meanwhile, the same components as those of the optical modulator 5C of the fourth embodiment are denoted by the same reference symbols, and explanation of the same configuration and operation will be omitted.

The optical modulator 5E illustrated in FIG. 9 is configured such that the driver 21 is electrically connected to the optical modulator 5C illustrated in FIG. 6. The driver 21 illustrated in FIG. 9 is connected to the first signal electrode 16A4 on the second outward side and the second signal electrode 16B4 on the second outward side in the optical modulator 5C with Au wires illustrated in FIG. 7. The driver 21 is connected to the fourth ground electrode 15D2 on the return side and the fifth ground electrode 15E2 on the return side by Au wires. The driver 21 amplifies an electrical signal and applies the amplified electrical signal to the first signal electrode 16A and the second signal electrode 16B. The driver 21 is electrically connected to the vicinity of one side of a chip of the optical modulator 5E by the Au wires.

The driver 21 is obliquely and electrically connected such that the first signal electrode 16A4 on the second outward side, the second signal electrode 16B4 on the second outward side, the fourth ground electrode 15D2 on the return side, the fifth ground electrode 15E2 on the return side, the first optical waveguide 14A, and the second optical waveguide 14B are not arranged parallel to one another. As a result, inclined portions of the first signal electrode 16A4 on the second outward side, the second signal electrode 16B4 on the second outward side, the fourth ground electrode 15D2 on the return side, and the fifth ground electrode 15E2 on the return side are prevented from functioning as interaction portions.

In the optical modulator 5E of the sixth embodiment, due to the electrical connection to the vicinity of the one side of the chip using the Au wires, it is possible to achieve the connection in a short distance and in an efficient manner.

According to one embodiment of the optical device and the like disclosed in the present application, it is possible to improve modulation efficiency.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
an X-cut substrate;
a first optical waveguide and a second optical waveguide each being formed on the X-cut substrate and having a folding structure;
a first signal electrode that is arranged on the X-cut substrate and generates a first electric field in accordance with one type electric signal of DC (Direct Current) signal or AC (Alternating Current) signal; and
a second signal electrode that is arranged on the X-cut substrate and that generates a second electric field with a reverse phase as compared to the first electric field in accordance with a same type electric signal as the one type electric signal, wherein
the first optical waveguide includes
a first optical waveguide on an outward side to which the first electric field is applied from the first signal electrode; and
a first optical waveguide on a return side to which the second electric field is applied from the second signal electrode, and
the second optical waveguide includes
a second optical waveguide on the outward side to which the first electric field is applied from the first signal electrode; and
a second optical waveguide on the return side to which the second electric field is applied from the second signal electrode.

2. The optical device according to claim 1, wherein
a direction of the first electric field applied to the first optical waveguide on the outward side and a direction of the second electric field applied to the first optical waveguide on the return side are same, and
a direction of the second electric field applied to the second optical waveguide on the outward side and a direction of the first electric field applied to the second optical waveguide on the return side are same.

3. The optical device according to claim 1, wherein
a direction of a crystal of the X-cut substrate, a direction of the first electric field applied to the first optical waveguide on the outward side, and a direction of the second electric field applied to the first optical waveguide on the return side are same.

4. The optical device according to claim 1, wherein
a first ground electrode, a second electrode, and a third electrode are arranged parallel to one another on the X-cut substrate, the first ground electrode having a folding structure and including a first ground electrode on the outward side and a first ground electrode on the return side, a second ground electrode having a folding structure and including a second ground electrode on the outward side and a second ground electrode on the return side;
a first signal electrode and a second signal electrode are arranged parallel to each another on the X-cut substrate, the first signal electrode having a folding structure and including a first signal electrode on the outward side and a first signal electrode on the return side, the second signal electrode having a folding structure and including a second signal electrode on the outward side and a second signal electrode on the return side,
the first optical waveguide on the outward side is arranged between the second ground electrode on the outward side and the second signal electrode on the outward side,
the second optical waveguide on the outward side is arranged between the second signal electrode on the outward side and a third ground electrode,
the first optical waveguide on the return side is arranged between the first ground electrode on the return side and the first signal electrode on the return side, and
the second optical waveguide on the return side is arranged between the first signal electrode on the return side and the second ground electrode on the return side.

5. The optical device according to claim 4, wherein
a first ground electrode and a third ground electrode are arranged parallel to each other on the X-cut substrate, the first ground electrode having a folding structure and including a first ground electrode on the outward side and a first ground electrode on the return side,
a first signal electrode and a second signal electrode are arranged parallel to each other on the X-cut substrate, the first signal electrode having a folding structure and including a first signal electrode on the outward side and a first signal electrode on the return side, the second signal electrode having a folding structure and including a second signal electrode on the outward side and a second signal electrode on the return side,
the first optical waveguide on the outward side is arranged between the first signal electrode on the outward side and the second signal electrode on the outward side,
the second optical waveguide on the outward side is arranged between the second signal electrode on the outward side and the third ground electrode,
the first optical waveguide on the return side is arranged between the first ground electrode on the return side and the first signal electrode on the return side, and
the second optical waveguide on the return side is arranged between the first signal electrode on the return side and the second signal electrode on the return side.

6. The optical device according to claim 1, wherein
the first optical waveguide includes a first optical waveguide on the outward side, a first optical waveguide on the return side, and a first intermediate optical waveguide that connect the first optical waveguide on the outward side and the first optical waveguide on the return side,
the second optical waveguide includes a second optical waveguide on the outward side, a second optical waveguide on the return side, and a second intermediate optical waveguide that connects the second optical waveguide on the outward side and the second optical waveguide on the return side, and an optical waveguide length of the first intermediate optical waveguide and an optical waveguide length of the second intermediate optical waveguide are adjusted such that the optical waveguide length of the first optical waveguide and the optical waveguide length of the second optical waveguide become same.

7. The optical device according to claim 1, wherein
a fourth ground electrode and a fifth ground electrode are arranged on the X-cut substrate, the fourth ground electrode having a folding structure and including a fourth ground electrode on the outward side and a fourth ground electrode on the return side, the fifth ground electrode having a folding structure and including a fifth ground electrode on the outward side and a fifth ground electrode on the return side,
a first signal electrode and a second signal electrode are arranged parallel to each other on the X-cut substrate, the first signal electrode having a folding structure, the second signal electrode having a folding structure,
the first optical waveguide includes a first optical waveguide on a first outward side, a first optical waveguide on a second outward side, and a first optical waveguide on the return side that connects the first optical waveguide on the first outward side and the first optical waveguide on the second outward side,
the second optical waveguide includes a second optical waveguide on the first outward side, a second optical waveguide on the second outward side, and a second optical waveguide on the return side that connects the second optical waveguide on the first outward side and the second optical waveguide on the second outward side,
the first signal electrode includes a first signal electrode on the first outward side, a first signal electrode on the second outward side, and a first signal electrode on the return side that connects the first signal electrode on the first outward side and the first signal electrode on the second outward side,
the second signal electrode includes a second signal electrode on the first outward side, a second signal electrode on the second outward side, and a second signal electrode on the return side that connects the second signal electrode on the first outward side and the second signal electrode on the second outward side,
the first optical waveguide on the first outward side is arranged between the first signal electrode on the first outward side and the second signal electrode on the first outward side,
the second optical waveguide on the first outward side is arranged between the second signal electrode on the first outward side and the fifth ground electrode on the outward side,
the first optical waveguide on the return side is arranged between the fourth ground electrode on the return side and the first signal electrode on the return side,
the second optical waveguide on the return side is arranged between the first signal electrode on the return side and the second signal electrode on the return side,
the first optical waveguide on the second outward side is arranged between the first signal electrode on the second outward side and the second signal electrode on the second outward side,
the second optical waveguide on the second outward side is arranged between the second signal electrode on the second outward side and the fifth ground electrode on the return side,
an optical waveguide length of the first optical waveguide on the return side is set to be longer than one of an optical waveguide length of the first optical waveguide on the first outward side and an optical waveguide length of the first optical waveguide on the second outward side, and
an optical waveguide length of the second optical waveguide on the return side is set to be longer than one of an optical waveguide length of the second optical waveguide on the first outward side and an optical waveguide length of the second optical waveguide on the second outward side.

8. An optical communication apparatus comprising:
a processor that performs signal processing on an electrical signal;
a light source that generates light; and
an optical device that modulates light generated from the light source by using an electrical signal output by the processor,
the optical device includes:
  an X-cut substrate;
  a first optical waveguide and a second optical waveguide each being formed on the X-cut substrate and having a folding structure;
  a first signal electrode that is arranged on the X-cut substrate and generates a first electric field in accordance with one type electric signal of DC (Direct Current) signal or AC (Alternating Current) signal; and
  a second signal electrode that is arranged on the X-cut substrate and that generates a second electric field with a reverse phase as compared to the first electric field in accordance with one type electric signal of DC (Direct Current) signal or AC (Alternating Current) signal, wherein
the first optical waveguide includes
  a first optical waveguide on an outward side to which the first electric field is applied from the first signal electrode; and
  a first optical waveguide on a return side to which the second electric field is applied from the second signal electrode, and
the second optical waveguide includes
  a second optical waveguide on the outward side to which the first electric field is applied from the first signal electrode; and
  a second optical waveguide on the return side to which the second electric field is applied from the second signal electrode.

* * * * *